United States Patent
Bátai et al.

(10) Patent No.: US 10,849,205 B2
(45) Date of Patent: Nov. 24, 2020

(54) LUMINAIRE HAVING A BEACON AND A DIRECTIONAL ANTENNA

(71) Applicant: CURRENT LIGHTING SOLUTIONS, LLC, East Cleveland, OH (US)

(72) Inventors: Roland Bátai, BudaPest (HU); Selaka Bandara Bulumulla, Niskayuna, NY (US); Gábor Fehér, BudaPest (HU); Michael J. Hartman, Clifton Park, NY (US); Róbert Horváth, BudaPest (HU); Gábor Balint Török, BudaPest (HU)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/883,613

(22) Filed: Oct. 14, 2015

(65) Prior Publication Data

US 2017/0111980 A1   Apr. 20, 2017

(51) Int. Cl.
| | | |
|---|---|---|
| H05B 37/02 | (2006.01) | |
| H05B 47/19 | (2020.01) | |
| H04W 64/00 | (2009.01) | |
| G01S 1/04 | (2006.01) | |
| G01S 1/68 | (2006.01) | |
| H05B 45/00 | (2020.01) | |

(52) U.S. Cl.
CPC ............ *H05B 47/19* (2020.01); *G01S 1/042* (2013.01); *G01S 1/0428* (2019.08); *G01S 1/68* (2013.01); *H04W 64/00* (2013.01); *H05B 45/00* (2020.01)

(58) Field of Classification Search
CPC ............ H05B 33/0815; H05B 33/0851; H05B 33/0863; H05B 37/0218; H05B 37/0227; H05B 37/0272
USPC .................................. 315/34, 35, 307, 312
See application file for complete search history.

(56) References Cited

U.S. PATENT DOCUMENTS

| | | |
|---|---|---|
| 5,815,114 A | 9/1998 | Speasl et al. |
| 5,940,346 A | 8/1999 | Sadowsky et al. |

(Continued)

FOREIGN PATENT DOCUMENTS

| | | |
|---|---|---|
| AU | 2011205051 B2 | 7/2013 |
| BR | 1000143 A2 | 3/2011 |

(Continued)

OTHER PUBLICATIONS

Mahbubani, "Antarctica: Exploring the Capabilites of Phased Array Antennas", UC San Diego Electronic Theses and Dissertations, 137 pages, 2008.

(Continued)

*Primary Examiner* — Tung X Le
(74) *Attorney, Agent, or Firm* — Buckley, Maschoff & Talwalkar LLC

(57) ABSTRACT

An apparatus, method, and system, the apparatus including a housing; a light source, disposed in the housing, including at least one source of illumination; a radio frequency (RF) transmitter located on or in the housing; and at least one directional radiating element at least partially enclosed by the housing and coupled to RF transmitter, the at least one directional radiating element directing a RF signal transmitted by the RF transmitter in a predetermined direction away from the housing.

4 Claims, 13 Drawing Sheets

(56) References Cited

U.S. PATENT DOCUMENTS

| | | | |
|---|---|---|---|
| 5,959,575 A | 9/1999 | Abbott | |
| 6,241,364 B1 | 6/2001 | Want et al. | |
| 6,292,744 B1 | 9/2001 | Want et al. | |
| 6,323,807 B1 | 11/2001 | Golding et al. | |
| 6,449,593 B1 | 9/2002 | Valve | |
| 6,819,286 B2 | 11/2004 | Armbruster et al. | |
| 7,511,662 B2 | 3/2009 | Mathews et al. | |
| 7,633,438 B2 | 12/2009 | Tysowski | |
| 7,741,782 B2 | 6/2010 | Vermeulen et al. | |
| 7,751,829 B2 | 7/2010 | Masuoka et al. | |
| 7,768,974 B2 | 8/2010 | Li et al. | |
| 7,834,983 B2 | 11/2010 | Song et al. | |
| 7,924,149 B2 | 4/2011 | Mendelson | |
| 7,969,297 B2 | 6/2011 | Haartsen et al. | |
| 7,990,275 B1 | 8/2011 | Milanovich et al. | |
| 7,991,576 B2 | 8/2011 | Roumeliotis | |
| 8,009,099 B2 | 8/2011 | Kalliola et al. | |
| 8,022,875 B2 | 9/2011 | Huang et al. | |
| 8,022,876 B2 | 9/2011 | Huang et al. | |
| 8,031,120 B2 | 10/2011 | Smith et al. | |
| 8,049,618 B2 | 11/2011 | Park et al. | |
| 8,072,381 B1 | 12/2011 | Ziegler | |
| 8,155,872 B2 | 4/2012 | Kjeldsen et al. | |
| 8,165,150 B2 | 4/2012 | Aweya et al. | |
| 8,203,910 B2 | 6/2012 | Zhao et al. | |
| 8,214,081 B2 | 7/2012 | Choi et al. | |
| 8,248,467 B1 | 8/2012 | Ganick et al. | |
| 8,259,692 B2 | 9/2012 | Bajko | |
| 8,274,396 B2 | 9/2012 | Gurley et al. | |
| 8,279,840 B2 | 10/2012 | Walker, Sr. | |
| 8,280,398 B2 | 10/2012 | Ishii et al. | |
| 8,320,939 B1 | 11/2012 | Vincent | |
| 8,331,790 B2 | 12/2012 | Pederson et al. | |
| 8,334,901 B1 | 12/2012 | Ganick et al. | |
| 8,373,362 B2 | 2/2013 | Chemel et al. | |
| 8,385,943 B1 | 2/2013 | Han et al. | |
| 8,411,258 B2 | 4/2013 | Roberts et al. | |
| 8,412,183 B1 | 4/2013 | Kadous et al. | |
| 8,416,290 B2 | 4/2013 | Ryan et al. | |
| 8,432,438 B2 | 4/2013 | Ryan et al. | |
| 8,436,896 B2 | 5/2013 | Staats et al. | |
| 8,457,502 B2 | 6/2013 | Ryan et al. | |
| 8,463,541 B2 | 6/2013 | Park | |
| 8,504,058 B2 | 8/2013 | Wigren | |
| 8,510,033 B2 | 8/2013 | Park et al. | |
| 8,534,127 B2 | 9/2013 | Seeger et al. | |
| 8,565,783 B2 | 10/2013 | Yang et al. | |
| 8,566,032 B2 | 10/2013 | Chowdhary et al. | |
| 8,567,246 B2 | 10/2013 | Shaeffer et al. | |
| 8,578,773 B1 | 11/2013 | Feng et al. | |
| 8,594,971 B2 | 11/2013 | Keal et al. | |
| 8,606,295 B2 | 12/2013 | Jang et al. | |
| 8,630,819 B2 | 1/2014 | English et al. | |
| 8,633,646 B2 | 1/2014 | Molezion | |
| 8,635,016 B2 | 1/2014 | Han et al. | |
| 8,687,608 B2 | 4/2014 | Soliman | |
| 8,878,666 B2 | 11/2014 | Chu | |
| 8,928,529 B2 | 1/2015 | Kee et al. | |
| 8,949,025 B2 | 2/2015 | Garin | |
| 9,058,732 B2 | 6/2015 | Chen et al. | |
| 9,142,051 B2 | 9/2015 | Kwak | |
| 9,209,909 B2 | 12/2015 | Booij et al. | |
| 9,213,082 B2 | 12/2015 | Aggarwal et al. | |
| 2003/0028260 A1* | 2/2003 | Blackwell | H05B 45/20 700/18 |
| 2004/0021515 A1 | 2/2004 | Michalson et al. | |
| 2004/0192227 A1* | 9/2004 | Beach | H05B 37/0272 455/90.3 |
| 2005/0094610 A1 | 5/2005 | de Clerq et al. | |
| 2006/0071854 A1 | 4/2006 | Wilcox | |
| 2006/0208946 A1 | 9/2006 | Bailey et al. | |
| 2007/0049291 A1 | 3/2007 | Kim et al. | |
| 2007/0218914 A1 | 9/2007 | Mori et al. | |
| 2007/0252528 A1* | 11/2007 | Vermuelen | F21V 3/04 315/34 |
| 2007/0271011 A1 | 11/2007 | Lee et al. | |
| 2008/0316022 A1 | 12/2008 | Buck et al. | |
| 2009/0099767 A1 | 4/2009 | Jung | |
| 2009/0264141 A1 | 10/2009 | Green et al. | |
| 2010/0179889 A1 | 7/2010 | Johnsmeyer et al. | |
| 2010/0198504 A1 | 8/2010 | Samsalovic et al. | |
| 2010/0259450 A1 | 10/2010 | Kainulainen et al. | |
| 2010/0304762 A1 | 12/2010 | Hall | |
| 2011/0009149 A1 | 1/2011 | Chen et al. | |
| 2011/0176803 A1 | 7/2011 | Song et al. | |
| 2011/0221635 A1 | 9/2011 | Wang | |
| 2011/0316888 A1 | 12/2011 | Sachs et al. | |
| 2012/0021760 A1 | 1/2012 | Strohbach et al. | |
| 2012/0028654 A1 | 2/2012 | Gupta et al. | |
| 2012/0130762 A1 | 5/2012 | Gale et al. | |
| 2012/0143495 A1 | 6/2012 | Dantu | |
| 2012/0157116 A1 | 6/2012 | Karlsson et al. | |
| 2012/0158297 A1 | 6/2012 | Kim et al. | |
| 2012/0191512 A1 | 7/2012 | Wuoti et al. | |
| 2012/0230254 A1 | 9/2012 | Otamendi et al. | |
| 2012/0239536 A1 | 9/2012 | Takahashi | |
| 2012/0271448 A1 | 10/2012 | Freeman et al. | |
| 2012/0274208 A1 | 11/2012 | Chen et al. | |
| 2012/0280863 A1 | 11/2012 | Persson et al. | |
| 2012/0286992 A1 | 11/2012 | Tekin et al. | |
| 2012/0290256 A1 | 11/2012 | Wang et al. | |
| 2012/0295632 A1 | 11/2012 | Karlsson et al. | |
| 2012/0302261 A1 | 11/2012 | Tinnakornsrisuphap et al. | |
| 2013/0002484 A1 | 1/2013 | Katz | |
| 2013/0003572 A1 | 1/2013 | Kim et al. | |
| 2013/0012235 A1 | 1/2013 | Burdo et al. | |
| 2013/0016012 A1 | 1/2013 | Beauregard | |
| 2013/0017842 A1 | 1/2013 | Gupta et al. | |
| 2013/0021795 A1 | 1/2013 | Chien | |
| 2013/0026224 A1 | 1/2013 | Ganick et al. | |
| 2013/0026945 A1 | 1/2013 | Ganick et al. | |
| 2013/0039391 A1 | 2/2013 | Skarp | |
| 2013/0069866 A1 | 3/2013 | Aria et al. | |
| 2013/0073681 A1 | 3/2013 | Jiang et al. | |
| 2013/0083631 A1 | 4/2013 | Harrell et al. | |
| 2013/0084886 A1 | 4/2013 | Crilly, Jr. et al. | |
| 2013/0088725 A1 | 4/2013 | Yeh et al. | |
| 2013/0091309 A1 | 4/2013 | Bjontegard et al. | |
| 2013/0093619 A1 | 4/2013 | Joo et al. | |
| 2013/0099955 A1 | 4/2013 | Shaeffer et al. | |
| 2013/0099962 A1 | 4/2013 | Katz | |
| 2013/0099968 A1 | 4/2013 | Katz | |
| 2013/0106782 A1 | 5/2013 | Nowatzyk et al. | |
| 2013/0109406 A1 | 5/2013 | Meador et al. | |
| 2013/0127660 A1 | 5/2013 | Torimoto et al. | |
| 2013/0133421 A1 | 5/2013 | Katz | |
| 2013/0134906 A1 | 5/2013 | Picariello | |
| 2013/0138342 A1 | 5/2013 | Zaid et al. | |
| 2013/0141463 A1 | 6/2013 | Barnett et al. | |
| 2013/0141554 A1 | 6/2013 | Ganick et al. | |
| 2013/0142384 A1 | 6/2013 | Ofek | |
| 2013/0163879 A1 | 6/2013 | Katz et al. | |
| 2013/0166193 A1 | 6/2013 | Goldman et al. | |
| 2013/0169474 A1 | 7/2013 | White et al. | |
| 2013/0201668 A1 | 8/2013 | Chien | |
| 2013/0211711 A1 | 8/2013 | Kelly et al. | |
| 2013/0211718 A1 | 8/2013 | Yoo et al. | |
| 2013/0217410 A1 | 8/2013 | Ku et al. | |
| 2013/0225197 A1 | 8/2013 | McGregor et al. | |
| 2013/0226451 A1 | 8/2013 | O'Neill et al. | |
| 2013/0244691 A1 | 9/2013 | Kelly | |
| 2013/0245937 A1 | 9/2013 | Dibernardo et al. | |
| 2013/0245942 A1 | 9/2013 | Ure | |
| 2013/0246848 A1 | 9/2013 | Gao et al. | |
| 2013/0261964 A1 | 10/2013 | Goldman et al. | |
| 2013/0262223 A1 | 10/2013 | Catane et al. | |
| 2013/0278459 A1 | 10/2013 | Jin | |
| 2013/0279543 A1 | 10/2013 | Torimoto et al. | |
| 2013/0293416 A1 | 11/2013 | Waters et al. | |
| 2013/0294306 A1 | 11/2013 | Borges et al. | |
| 2013/0295952 A1 | 11/2013 | Chao et al. | |
| 2013/0297205 A1 | 11/2013 | Kim et al. | |
| 2013/0310081 A1 | 11/2013 | Chu | |
| 2013/0317778 A1 | 11/2013 | Gupta et al. | |

(56) References Cited

U.S. PATENT DOCUMENTS

| | | | |
|---|---|---|---|
| 2013/0317916 | A1 | 11/2013 | Gopalakrishnan et al. |
| 2013/0322415 | A1 | 12/2013 | Chamarti et al. |
| 2013/0330085 | A1 | 12/2013 | Kusakari |
| 2013/0331037 | A1 | 12/2013 | Kusakari |
| 2013/0332273 | A1 | 12/2013 | Gu et al. |
| 2013/0339891 | A1 | 12/2013 | Blumenberg et al. |
| 2013/0342399 | A1 | 12/2013 | Fukuda et al. |
| 2014/0002307 | A1 | 1/2014 | Mole et al. |
| 2014/0003823 | A1 | 1/2014 | Roberts et al. |
| 2014/0006907 | A1 | 1/2014 | Roberts et al. |
| 2014/0009291 | A1* | 1/2014 | Requist ............ G06K 7/10386 340/572.1 |
| 2014/0122017 | A1 | 5/2014 | Chu |
| 2014/0168020 | A1 | 6/2014 | Stoytchev et al. |
| 2014/0204581 | A1 | 7/2014 | De Jong et al. |
| 2014/0218913 | A1 | 8/2014 | Cozzolino et al. |
| 2014/0235269 | A1 | 8/2014 | Ericsson |
| 2014/0252958 | A1* | 9/2014 | Subotnick ......... H05B 37/0218 315/149 |
| 2014/0273892 | A1 | 9/2014 | Nourbakhsh |
| 2014/0292194 | A1 | 10/2014 | Sagal et al. |
| 2015/0076993 | A1 | 3/2015 | Mohan |
| 2015/0147067 | A1* | 5/2015 | Ryan ..................... H04L 67/12 398/118 |
| 2015/0237700 | A1* | 8/2015 | Woytowitz ........ H05B 33/0863 315/307 |
| 2015/0256963 | A1* | 9/2015 | Dahlen ................. H04W 4/008 455/41.2 |
| 2015/0377479 | A1* | 12/2015 | Pescod .................. H01Q 1/007 362/85 |
| 2016/0223153 | A1* | 8/2016 | Van Dijk ................. F21S 8/03 |
| 2017/0098884 | A1* | 4/2017 | Barnickel ............... H01Q 1/24 |
| 2017/0228566 | A1* | 8/2017 | Sengstaken, Jr. .. G06K 7/10009 |

FOREIGN PATENT DOCUMENTS

| | | |
|---|---|---|
| CA | 2250900 C | 9/2003 |
| CN | 1420364 A | 5/2003 |
| CN | 1878024 A | 12/2006 |
| CN | 1888930 A | 1/2007 |
| CN | 2855004 Y | 1/2007 |
| CN | 1942013 A | 4/2007 |
| CN | 2927070 Y | 7/2007 |
| CN | 101055672 A | 10/2007 |
| CN | 101094137 A | 12/2007 |
| CN | 101163366 A | 4/2008 |
| CN | 201061167 Y | 5/2008 |
| CN | 101191833 A | 6/2008 |
| CN | 100403850 C | 7/2008 |
| CN | 201138375 Y | 10/2008 |
| CN | 101459870 A | 6/2009 |
| CN | 101466070 A | 6/2009 |
| CN | 101487714 A | 7/2009 |
| CN | 100568882 C | 12/2009 |
| CN | 101639345 A | 2/2010 |
| CN | 201535817 U | 7/2010 |
| CN | 101029923 B | 8/2010 |
| CN | 101158719 B | 1/2011 |
| CN | 101959129 A | 1/2011 |
| CN | 101169226 B | 3/2011 |
| CN | 101039493 B | 4/2011 |
| CN | 101252786 B | 4/2011 |
| CN | 101487884 B | 5/2011 |
| CN | 102057294 A | 5/2011 |
| CN | 101251591 B | 6/2011 |
| CN | 101551454 B | 6/2011 |
| CN | 102084722 A | 6/2011 |
| CN | 201858980 U | 6/2011 |
| CN | 101191835 B | 7/2011 |
| CN | 102116859 A | 7/2011 |
| CN | 201903916 U | 7/2011 |
| CN | 102143213 A | 8/2011 |
| CN | 102170697 A | 8/2011 |
| CN | 102203768 A | 9/2011 |
| CN | 102209386 A | 10/2011 |
| CN | 102231912 A | 11/2011 |
| CN | 102253367 A | 11/2011 |
| CN | 101604397 B | 1/2012 |
| CN | 101799532 B | 1/2012 |
| CN | 102306264 A | 1/2012 |
| CN | 102338866 A | 2/2012 |
| CN | 102378918 A | 3/2012 |
| CN | 102419180 A | 4/2012 |
| CN | 101750598 B | 6/2012 |
| CN | 102135429 B | 6/2012 |
| CN | 102521328 A | 6/2012 |
| CN | 101778399 B | 7/2012 |
| CN | 102540172 A | 7/2012 |
| CN | 102573049 A | 7/2012 |
| CN | 102573057 A | 7/2012 |
| CN | 102053238 B | 8/2012 |
| CN | 102629329 A | 8/2012 |
| CN | 102645645 A | 8/2012 |
| CN | 102655629 A | 9/2012 |
| CN | 101895953 B | 10/2012 |
| CN | 102711239 A | 10/2012 |
| CN | 102736062 A | 10/2012 |
| CN | 102737323 A | 10/2012 |
| CN | 102749072 A | 10/2012 |
| CN | 102750905 A | 10/2012 |
| CN | 102759354 A | 10/2012 |
| CN | 102782521 A | 11/2012 |
| CN | 102802260 A | 11/2012 |
| CN | 102802321 A | 11/2012 |
| CN | 102821465 A | 12/2012 |
| CN | 102829775 A | 12/2012 |
| CN | 102833013 A | 12/2012 |
| CN | 202582554 U | 12/2012 |
| CN | 202600136 U | 12/2012 |
| CN | 101695152 B | 1/2013 |
| CN | 102194300 B | 1/2013 |
| CN | 102880673 A | 1/2013 |
| CN | 102901948 A | 1/2013 |
| CN | 102905368 A | 1/2013 |
| CN | 101846736 B | 2/2013 |
| CN | 102917498 A | 2/2013 |
| CN | 202738203 U | 2/2013 |
| CN | 102982654 A | 3/2013 |
| CN | 202770447 U | 3/2013 |
| CN | 101547048 B | 4/2013 |
| CN | 102253365 B | 4/2013 |
| CN | 103017756 A | 4/2013 |
| CN | 103051531 A | 4/2013 |
| CN | 103052154 A | 4/2013 |
| CN | 202904027 U | 4/2013 |
| CN | 202907281 U | 4/2013 |
| CN | 101592727 B | 5/2013 |
| CN | 103134488 A | 6/2013 |
| CN | 103167032 A | 6/2013 |
| CN | 103167606 A | 6/2013 |
| CN | 103179661 A | 6/2013 |
| CN | 202995030 U | 6/2013 |
| CN | 103199898 A | 7/2013 |
| CN | 103200678 A | 7/2013 |
| CN | 103207381 A | 7/2013 |
| CN | 103209478 A | 7/2013 |
| CN | 103220780 A | 7/2013 |
| CN | 203038111 U | 7/2013 |
| CN | 203072171 U | 7/2013 |
| CN | 101984643 B | 8/2013 |
| CN | 103234539 A | 8/2013 |
| CN | 103235283 A | 8/2013 |
| CN | 103237344 A | 8/2013 |
| CN | 103238085 A | 8/2013 |
| CN | 103245345 A | 8/2013 |
| CN | 103267524 A | 8/2013 |
| CN | 103267526 A | 8/2013 |
| CN | 203120161 U | 8/2013 |
| CN | 203151747 U | 8/2013 |
| CN | 101479622 B | 9/2013 |
| CN | 103281281 A | 9/2013 |
| CN | 103281677 A | 9/2013 |
| CN | 103292805 A | 9/2013 |

(56) References Cited

FOREIGN PATENT DOCUMENTS

| | | |
|---|---|---|
| CN | 103313194 A | 9/2013 |
| CN | 203202730 U | 9/2013 |
| CN | 102105809 B | 10/2013 |
| CN | 103338509 A | 10/2013 |
| CN | 103376103 A | 10/2013 |
| CN | 103376441 A | 10/2013 |
| CN | 203224631 U | 10/2013 |
| CN | 203225920 U | 10/2013 |
| CN | 203233568 U | 10/2013 |
| CN | 203243549 U | 10/2013 |
| CN | 203243557 U | 10/2013 |
| CN | 102682572 B | 11/2013 |
| CN | 203279295 U | 11/2013 |
| CN | 203279296 U | 11/2013 |
| CN | 104658251 | 5/2015 |
| DE | 60319571 T2 | 3/2009 |
| DE | 102008050809 A1 | 6/2009 |
| EP | 1830488 A1 | 9/2007 |
| EP | 1905125 B1 | 9/2009 |
| EP | 1705459 B1 | 11/2009 |
| EP | 2177928 A1 | 4/2010 |
| EP | 2375267 A1 | 10/2011 |
| EP | 2393342 A1 | 12/2011 |
| EP | 2409290 A1 | 1/2012 |
| EP | 2488887 A1 | 8/2012 |
| EP | 2510310 A2 | 10/2012 |
| EP | 2583115 A1 | 4/2013 |
| EP | 2597423 A1 | 5/2013 |
| EP | 2597486 A2 | 5/2013 |
| EP | 2613168 A1 | 7/2013 |
| EP | 2238460 B1 | 8/2013 |
| EP | 2625907 A1 | 8/2013 |
| EP | 2625908 A1 | 8/2013 |
| EP | 2635917 A1 | 9/2013 |
| EP | 2637041 A1 | 9/2013 |
| EP | 2663877 A2 | 11/2013 |
| EP | 2671373 A1 | 12/2013 |
| EP | 2679042 A1 | 1/2014 |
| EP | 2737779 A1 | 6/2014 |
| FI | 20060811 A | 3/2008 |
| FR | 2992132 A1 | 12/2013 |
| GB | 2426399 A | 11/2006 |
| GB | 201210620 | 8/2012 |
| GB | 2499889 A | 9/2013 |
| GB | 2501596 A | 10/2013 |
| IN | 222398 B | 10/2007 |
| IN | 199700486 I1 | 10/2007 |
| IN | 201100792 P4 | 12/2011 |
| IN | 201000021 I2 | 5/2012 |
| IN | 201301661 I4 | 4/2013 |
| IN | 201201399 P3 | 10/2013 |
| IN | 201302679 P2 | 1/2014 |
| JP | 2000111648 A | 4/2000 |
| JP | 2002101039 A | 4/2002 |
| JP | 2002262331 A | 9/2002 |
| JP | 3336300 B2 | 10/2002 |
| JP | 2005351823 A | 12/2005 |
| JP | 2006266859 A | 10/2006 |
| JP | 2007064978 A | 3/2007 |
| JP | 2008070208 A | 3/2008 |
| JP | 2008227685 A | 9/2008 |
| JP | 2008234251 A | 10/2008 |
| JP | 2009232203 A | 10/2009 |
| JP | 4417531 B2 | 2/2010 |
| JP | 2011017684 A | 1/2011 |
| JP | 2011017685 A | 1/2011 |
| JP | 2011033609 A | 2/2011 |
| JP | 2011059091 A | 3/2011 |
| JP | 4694700 B2 | 6/2011 |
| JP | 2011107770 A | 6/2011 |
| JP | 2011145873 A | 7/2011 |
| JP | 2011176539 A | 9/2011 |
| JP | 2011214834 A | 10/2011 |
| JP | 2011214844 A | 10/2011 |
| JP | 4977210 B2 | 7/2012 |
| JP | 5015423 B2 | 8/2012 |
| JP | 2013083464 A | 5/2013 |
| JP | 2013121001 A | 6/2013 |
| JP | 2013521472 A | 6/2013 |
| JP | 2013131909 A | 7/2013 |
| JP | 2013167630 A | 8/2013 |
| JP | 5289317 B2 | 9/2013 |
| JP | 2013172451 A | 9/2013 |
| JP | 5313165 B2 | 10/2013 |
| JP | 5346214 B2 | 11/2013 |
| KR | 20010097458 A | 11/2001 |
| KR | 20010100705 A | 11/2001 |
| KR | 100404308 B1 | 11/2003 |
| KR | 100582018 B1 | 5/2006 |
| KR | 100695208 B1 | 3/2007 |
| KR | 100769115 B1 | 10/2007 |
| KR | 100805813 B1 | 2/2008 |
| KR | 20080034319 A | 4/2008 |
| KR | 100832840 B1 | 5/2008 |
| KR | 100834987 B1 | 6/2008 |
| KR | 100841712 B1 | 6/2008 |
| KR | 100868241 B1 | 11/2008 |
| KR | 20080098908 A | 11/2008 |
| KR | 100886835 B1 | 3/2009 |
| KR | 20090036675 A | 4/2009 |
| KR | 20090044329 A | 5/2009 |
| KR | 20090049158 A | 5/2009 |
| KR | 100908389 B1 | 7/2009 |
| KR | 20090070869 A | 7/2009 |
| KR | 20090072446 A | 7/2009 |
| KR | 20090128074 A | 12/2009 |
| KR | 100942352 B1 | 2/2010 |
| KR | 20100020689 A | 2/2010 |
| KR | 20100021325 A | 2/2010 |
| KR | 100946773 B1 | 3/2010 |
| KR | 20100058870 A | 6/2010 |
| KR | 20100059214 A | 6/2010 |
| KR | 100972815 B1 | 7/2010 |
| KR | 20100076340 A | 7/2010 |
| KR | 100978060 B1 | 8/2010 |
| KR | 100979623 B1 | 9/2010 |
| KR | 100990670 B1 | 10/2010 |
| KR | 200450509 Y1 | 10/2010 |
| KR | 20100112955 A | 10/2010 |
| KR | 101010786 B1 | 1/2011 |
| KR | 20110012317 A | 2/2011 |
| KR | 20110046224 A | 5/2011 |
| KR | 20110049945 A | 5/2011 |
| KR | 20110068340 A | 6/2011 |
| KR | 20110073040 A | 6/2011 |
| KR | 20110083961 A | 7/2011 |
| KR | 20110116564 A | 10/2011 |
| KR | 20110116565 A | 10/2011 |
| KR | 20110125333 A | 11/2011 |
| KR | 101095017 B1 | 12/2011 |
| KR | 101095266 B1 | 12/2011 |
| KR | 101118673 B1 | 3/2012 |
| KR | 20120035840 A | 4/2012 |
| KR | 20120047539 A | 5/2012 |
| KR | 20120069267 A | 6/2012 |
| KR | 101156913 B1 | 7/2012 |
| KR | 101165001 B1 | 7/2012 |
| KR | 20120071291 A | 7/2012 |
| KR | 20120072124 A | 7/2012 |
| KR | 20120072253 A | 7/2012 |
| KR | 20120078161 A | 7/2012 |
| KR | 1174126 B1 | 8/2012 |
| KR | 101176013 B1 | 8/2012 |
| KR | 20130004849 A | 1/2013 |
| KR | 101237877 B1 | 2/2013 |
| KR | 20130017135 A | 2/2013 |
| KR | 101241411 B1 | 3/2013 |
| KR | 101241793 B1 | 3/2013 |
| KR | 20130022782 A | 3/2013 |
| KR | 101257073 B1 | 4/2013 |
| KR | 101267405 B1 | 5/2013 |
| KR | 20130060279 A | 6/2013 |
| KR | 101283896 B1 | 7/2013 |
| KR | 20130074548 A | 7/2013 |

(56) References Cited

FOREIGN PATENT DOCUMENTS

| | | |
|---|---|---|
| KR | 20130085024 A | 7/2013 |
| KR | 101292277 B1 | 8/2013 |
| KR | 101293195 B1 | 8/2013 |
| KR | 101300394 B1 | 8/2013 |
| KR | 20130091908 A | 8/2013 |
| KR | 20130093025 A | 8/2013 |
| KR | 101304392 B1 | 9/2013 |
| KR | 101309291 B1 | 9/2013 |
| KR | 20130106954 A | 10/2013 |
| KR | 20130111926 A | 10/2013 |
| KR | 20130116453 A | 10/2013 |
| KR | 101329111 B1 | 11/2013 |
| KR | 20130126054 A | 11/2013 |
| KR | 101344408 B1 | 12/2013 |
| KR | 20130132599 A | 12/2013 |
| TW | 200715222 A | 4/2007 |
| TW | 200728759 A | 8/2007 |
| TW | 200925553 A | 6/2009 |
| TW | 200925555 A | 6/2009 |
| TW | 200928415 A | 7/2009 |
| TW | 200942852 A | 10/2009 |
| TW | 318691 B | 12/2009 |
| TW | 372260 A | 9/2012 |
| TW | 201237452 A | 9/2012 |
| TW | 201243377 A | 11/2012 |
| TW | 201328431 A | 7/2013 |
| TW | 201342955 A | 10/2013 |
| VN | 26213 A | 5/2011 |
| WO | 2007006552 A1 | 1/2007 |
| WO | 2008064535 A1 | 6/2008 |
| WO | 2008082783 A1 | 7/2008 |
| WO | 2009146577 A1 | 12/2009 |
| WO | 2012008650 A1 | 1/2012 |
| WO | 2012088833 A1 | 7/2012 |
| WO | 2012097384 A2 | 7/2012 |
| WO | 2012105763 A2 | 8/2012 |
| WO | 2012140610 A1 | 10/2012 |
| WO | 2012160560 A1 | 11/2012 |
| WO | 2013016439 A1 | 1/2013 |
| WO | 2013039700 A1 | 3/2013 |
| WO | 2013054144 A1 | 4/2013 |
| WO | 2013070170 A1 | 5/2013 |
| WO | 2013074065 A1 | 5/2013 |
| WO | 2013084428 A1 | 6/2013 |
| WO | 2013085750 A1 | 6/2013 |
| WO | 2013104127 A1 | 7/2013 |
| WO | 2013104128 A1 | 7/2013 |
| WO | 2013132393 A1 | 9/2013 |
| WO | 2013154618 A1 | 10/2013 |
| WO | 2013159217 A1 | 10/2013 |
| WO | 2013177167 A1 | 11/2013 |
| WO | 2014125302 A1 | 8/2014 |
| WO | 2014128507 A2 | 8/2014 |

OTHER PUBLICATIONS

Corral et al., "Use of Directional Antennas in ZigBee Indoor Location Networks", Signal Theory and Communications, 8 pages, 2014.

International Search Report and Written Opinion issued in connection with corresponding Application No. PCT/US2016/053297 dated Dec. 6, 2016.

Office Action & Search Report issued in connection with corresponding Chinese Application No. 201680073337.2 dated Nov. 26, 2019.

Office Action Issued in connection with corresponding Chinese Application No. 201680073337.2 dated Jul. 13, 2020.

* cited by examiner

LUMINAIRE HAVING A BEACON AND A DIRECTIONAL ANTENNA

BACKGROUND

Indoor positioning systems are known that use beacons to transmit an identifier. These systems are known to use omni-directional antennas to broadcast a signal including the identifier. The signal broadcast by the beacon and its associated omni-directional antenna may be detected and received by a receiver device that operates to determine its position based on the strength of the signals that it receives. The identifier from the strongest signal received by the receiver is generally equated with being the closet beacon. However, the strongest signal received by the receiver device may not be transmitted from the beacon closest to the receiver. This condition may be due, at least in part, to the omni-directional shape and direction of the signal broadcast by the beacon and its omni-directional antenna. A number of factors may contribute to the strongest signal received by the receiver not actually being the closet beacon including, for example, reflections in the indoor environment.

Therefore, it would be desirable to efficiently provide improved methods and apparatus for providing indoor positioning determinations for a variety of different applications.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, wherein.

DETAILED DESCRIPTION

Figure 1:
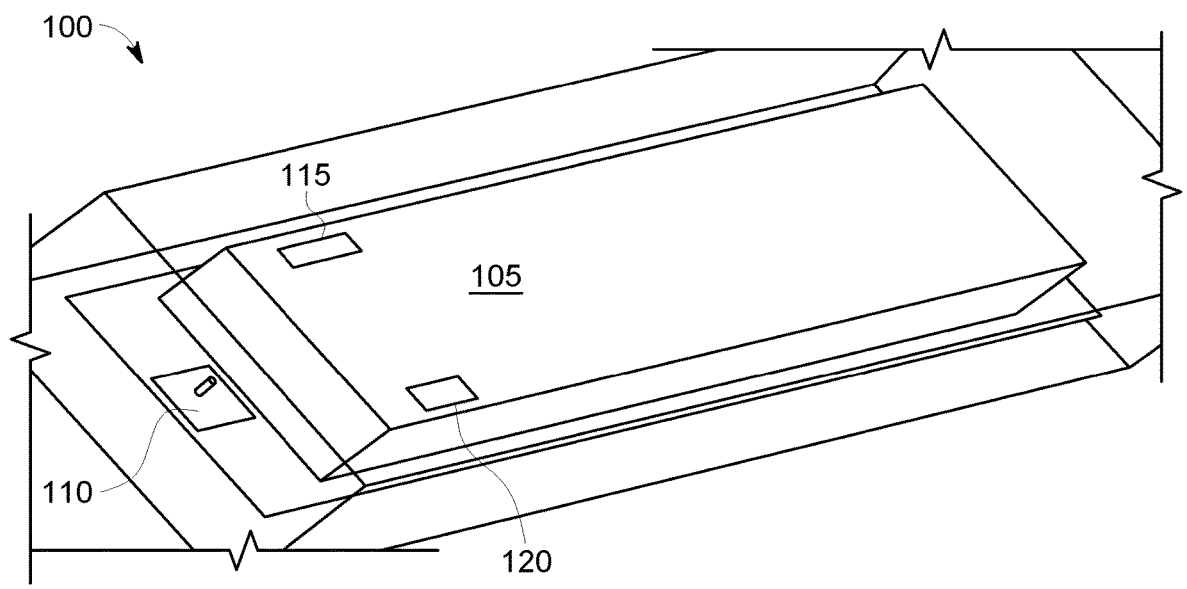
FIG. 1 is an illustrative depiction of a lighting fixture including a directional radiating element, in accordance with some aspects herein.

FIG. 1 is an illustrative depiction of a lighting fixture 100, in accordance with some embodiments herein. The lighting fixture 100 shown in FIG. 1 may be designated as a replacement of a T8 fluorescent lamp or other configurations based on its construction and configuration, as understood by those knowledgeable and skilled in the art of lighting. In some embodiments, lighting fixture 100 may include one or more light sources (not shown in FIG. 1). The light sources may be, in some embodiments, solid state light sources such as, for example, light emitting diodes. It will be appreciated by those skilled in the art(s) related hereto that light sources other than those specifically shown in the following discussion and corresponding drawings are within the scope of the present disclosure, to the extent that such light sources are compatible with other aspects of the various embodiments herein.

Lighting fixture 100 includes a housing 105 to enclose, support, and contain the components of the lighting fixture, including mechanical, optical, electrical, and other components of the lighting fixture. In some embodiments herein, lighting fixture 100 includes a radio frequency (RF) transmitter 115. In some aspects herein, RF transmitter 115 is, at least partially, located in or on housing 105. RF transmitter 115 is operative to transmit one or more RF signals. The transmitted RF signal may include, at least, an identifier assigned to the transmitter. In some aspects, the identifier propagated in the RF signal transmitted by RF transmitter 115 may be unique. In some embodiment, the uniqueness of the identifier for a RF transmitter herein may be universal or limited to a particular configuration such as a frequency band, a system configuration, a manufacturer, an identifier format, and other criteria. In some aspects, the identifier communicated in the signal from the RF transmitter may be interpreted to be an identifier for co-located lighting fixture 100. As such, an identifier transmitted by RF transmitter 115 may also be referred to as an identifier for lighting fixture 100. In some aspects, a single RF transmitter is included in each lighting fixture herein. Accordingly, each lighting fixture may have only a single identifier. In a specific embodiment, the identifier may be a sequence of numeric and alphabetic (alphanumeric) characters. In another embodiment, the identifier may be a sequence of digits in base 16 (hexadecimal). It is noted that the unique identifier may be configured and represented in other formats, without any loss of generality herein.

In some embodiments, the transmitted RF signal may have a fixed or adjustable transmit power, a fixed or adjustable transmit frequency, and a fixed or adjustable advertisement interval, in different embodiments. In some aspects, RF transmitter 115 may be configured according to a particular use-case or application being served by the lighting fixture 100. For example, in an indoor positioning system use-case including, for example a retail store setting, RF transmitter 115 may be configured to wirelessly transmit a signal having a frequency of about 2.4 GHz to about 2.485 GHz over short distances via a directional radiating element 110. In some embodiments, the frequency may switch between several channels (e.g. frequency hopping).

Directional radiating element 110 may comprise an antenna. In some embodiments, directional radiating element 110 may be a planar patch antenna. Directional radiating element 110 may comprise configurations other than a patch antenna, however the directional radiating element characteristically directs or shapes in a specific, pre-determined direction and pattern. While the pre-determined direction and pattern of the directional radiating element 110 may depend on the particular configuration of the directional radiating element, the direction and shape of the signal radiated by directional radiating element 110 is not omni-directional. In other words, the direction and shape of the signal radiated by a directional radiating element herein is other than omni-directional. In this manner, the RF signal(s) transmitted by RF transmitter 115 and further shaped and directed in particular direction(s) by antenna 110 may generally be more focused with regard to a distribution of the signal, as compared to a distribution of a similar or same transmitter that is coupled to an omni-directional radiating element.

Figure 2:
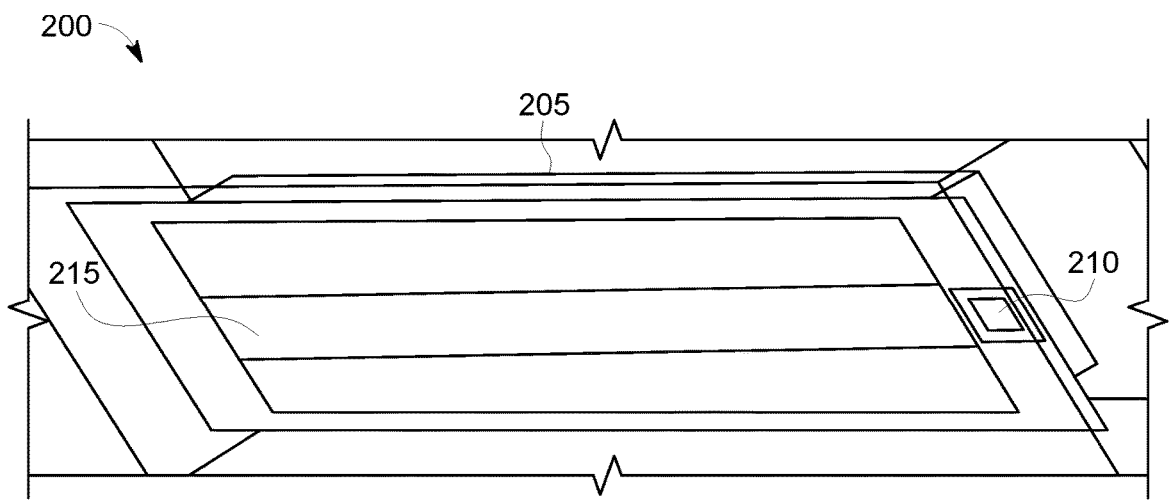
FIG. 2 is illustrative depiction of a lighting fixture including a directional radiating element, in accordance with some aspects herein.
Figure 3:
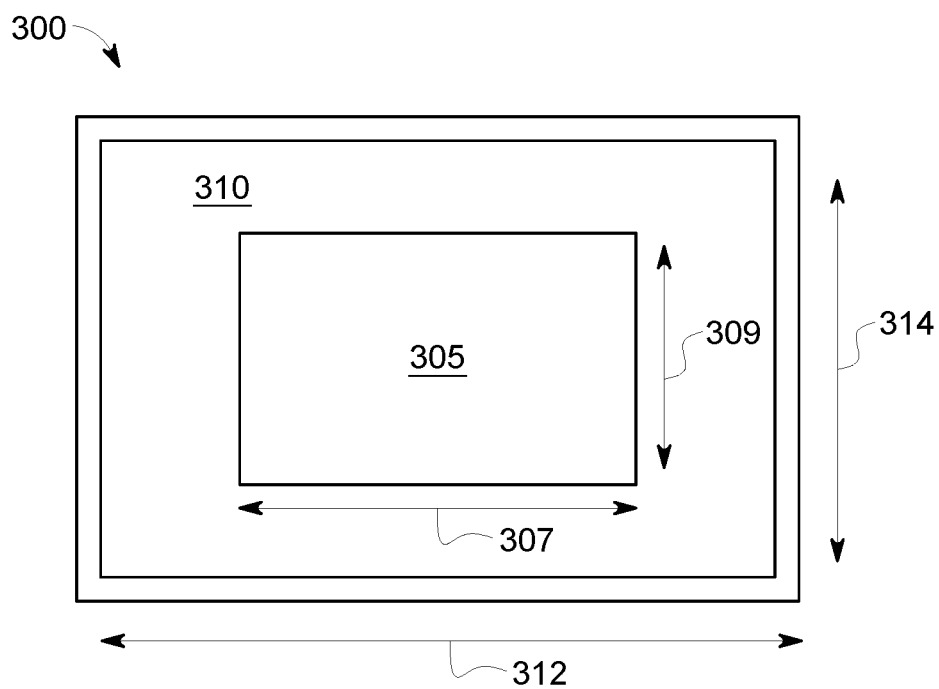
FIG. 3 is an illustrative depiction of a directional radiating element, in accordance with some embodiments herein.

FIG. 2 is an illustrative depiction of a lighting fixture 200. Lighting fixture 200 is shown in a perspective view from a vantage point below the lighting fixture, such as the case where, for example, the lighting fixture 200 is installed on, in, or from a ceiling location above an observer. Lighting fixture 200 includes a housing 205 and a directional radiating element 210, both of which are similar to like items discussed above with respect to FIG. 1. Lighting fixture also includes a light source 215 and a RF transmitter that is not shown in FIG. 2. Light source 215 may comprise one or more sources of illumination, including one or more types thereof without any loss of generality herein. FIG. 3 is an illustrative depiction of a directional radiating element, in accordance with some embodiments herein. In the example of FIG. 3, the directional radiating element comprises a planar patch antenna (i.e., a rectangular microstrip antenna). Patch antenna 300 includes a rectangular "patch" 305 of metal (e.g., copper) having a length 307 and a width 309. Patch antenna also includes a backside ground plane (not shown in FIG. 3) that is obscured by substrate 310. Substrate 310 may be constructed of a dielectric material, including a Polytetrafluoroethylene (PTFE) and other materials. Substrate 310 has a length 312 and a width 314. The dimensions of patch antenna 300 may be sized to optimize and/or match the frequency of the signal(s) fed to the antenna. For example, for a Bluetooth signal the patch antenna may have the following dimensions: 307=48 mm, 309=40.5 mm, 312=82 mm, and 314=70 mm. In some embodiments, the patch is about one-half wavelength long. In some regards, the sizes of the patch may be varied and changed due to the dielectric constant and thickness of substrate 310.

In some embodiments, patch antenna 300 radiates a linearly polarized wave. It is known that when electromagnetic signals encounter a boundary between two media with different refractive indices, some of the signals will usually be reflected. The fraction of the signals that is reflected is described by the Fresnel equations and is dependent upon the incoming signal's polarization and angle of incidence. The angle of incidence at which the signal with a particular polarization is perfectly transmitted through a dielectric surface (i.e., with no reflection) is referred to as Brewster's angle or the polarization angle. Based on this knowledge and the polarization of the directional antennas herein, the antennas may ideally be positioned at a location where the reflections from one beacon will not interfere with itself (i.e., zero reflections). In some applications and use-cases, the lighting fixtures disclosed herein with directional radiating antennas may be positioned such that the antennas therein transmit their signals at the Brewster's angle or close thereto in an effort to eliminate or at least minimize reflections by signals from the antenna.

Figure 4:
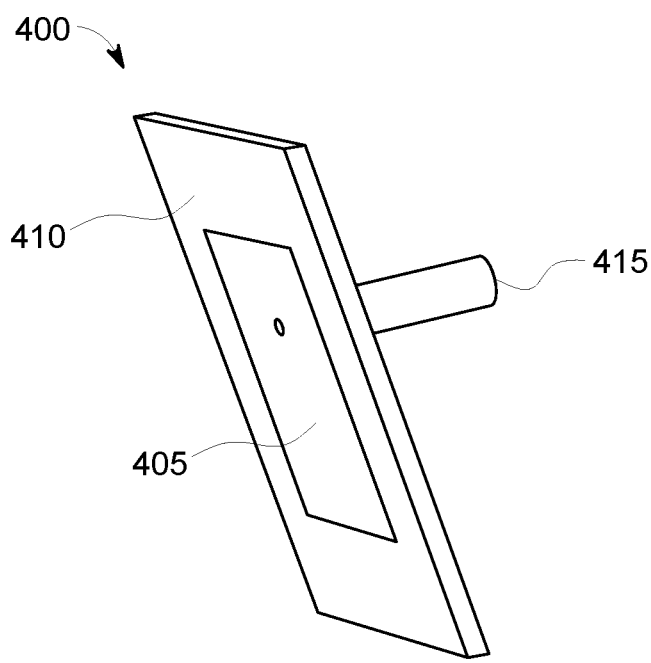
FIG. 4 is an illustrative depiction of a directional radiating element, in accordance with some embodiments herein

FIG. 4 is a perspective view of a patch antenna 400, in accordance with some aspects herein. Patch antenna 400 includes, inter alia, a metal patch 405, a substrate 410, and a ground plane (not shown). Additionally, a feed patch antenna 400 includes a feedline 415.

Figure 5:
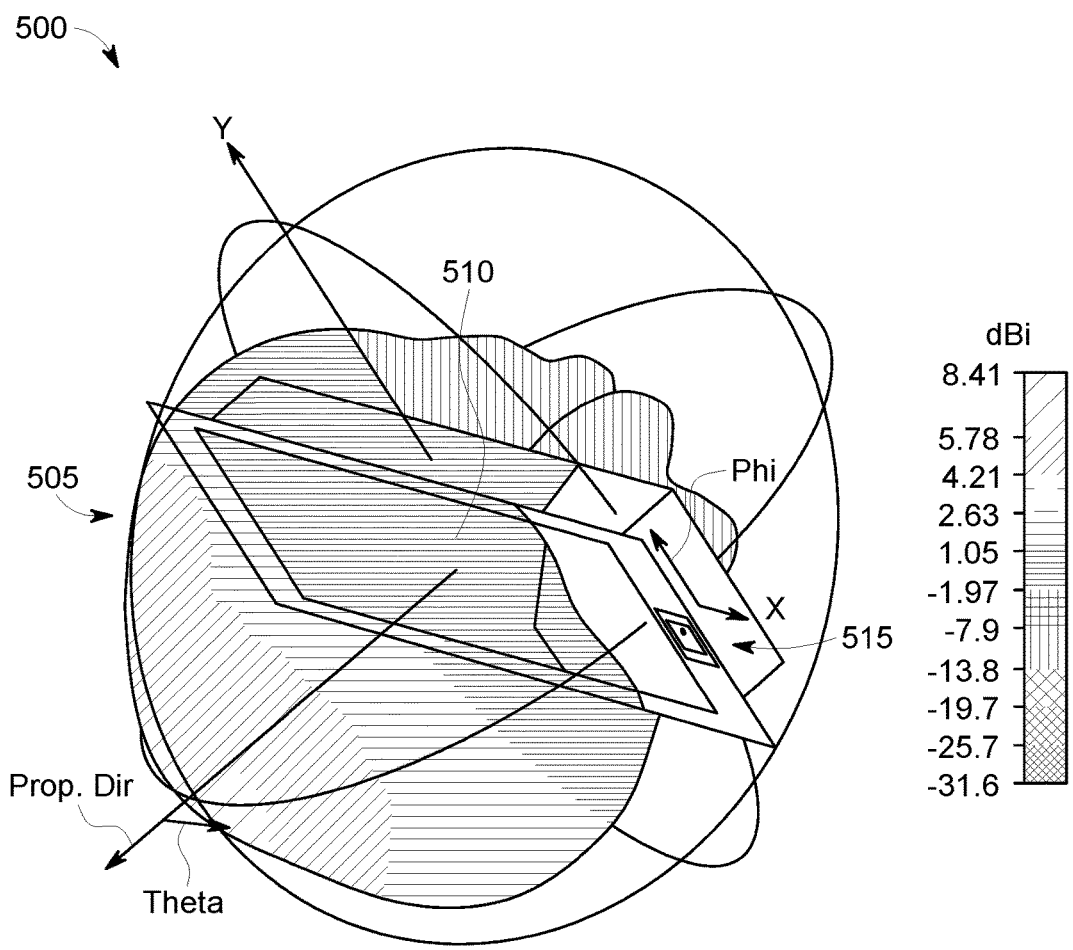
FIG. 5 is a radiation pattern corresponding to the lighting fixture of FIG. 2, according to some embodiments herein.

FIG. 5 is a depiction 500 of an antenna radiation pattern, in accordance with some embodiments herein. FIG. 5 shows a radiation distribution pattern 505 for a RF signal (RF frequency=2.45 GHz) shaped by an antenna 515 co-located with lighting fixture 510. The gain of the patch antenna across the distribution is conveyed by the variations in the shading of radiation pattern 505.

Figure 6:
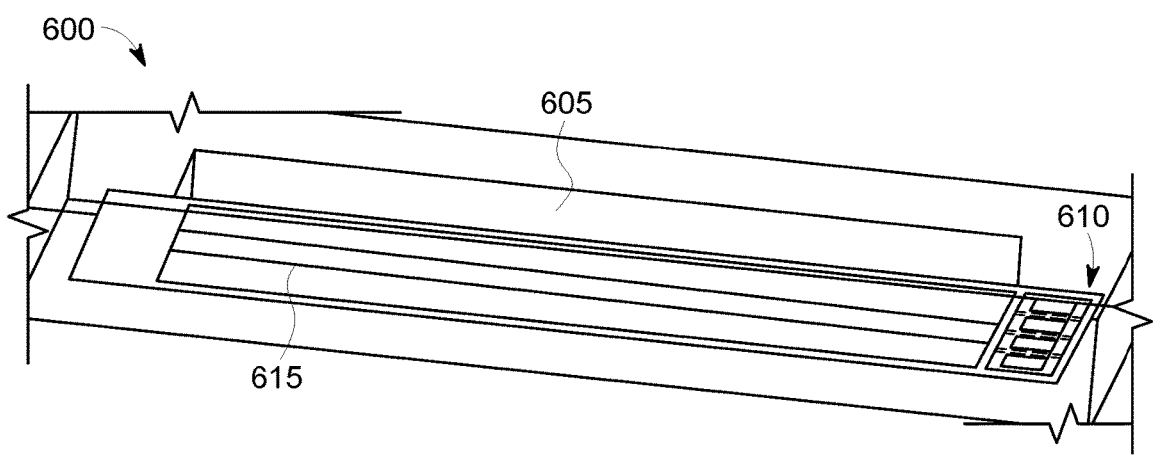
FIG. 6 is an illustrative depiction of a lighting fixture including an array of a plurality of directional radiating elements, in accordance with some embodiments herein.

FIG. 6 is an illustrative depiction of a lighting fixture 600, in accordance with some embodiments herein. Lighting fixture 600 includes a housing 605 that encloses, houses, or supports a light source 615 and an array 610 of a plurality of directional radiating elements. The array of directional radiating elements may include patch antennas similar to those shown in FIGS. 2-4. In the example of FIG. 6, the array of antennas includes four (4) patch antennas coupled to one RF transmitter. The antennas may be placed about one-half wavelength apart to create a "broadside array" that generates a very strong signal in the direction perpendicular to the array, in the direction below the lighting fixture. For the sake of clarity, other components of lighting fixture 600 are not shown in FIG. 6.

Figure 7:
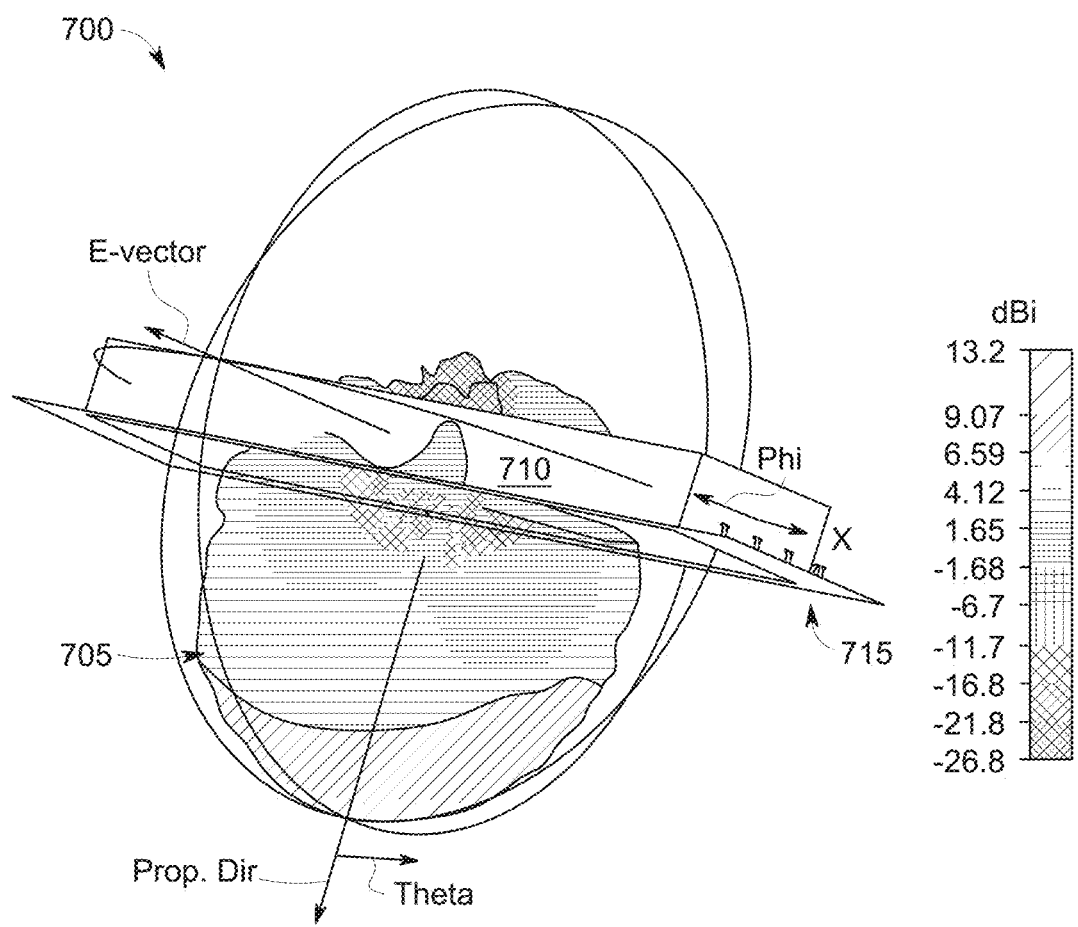
FIG. 7 is a radiation pattern corresponding to the lighting fixture of FIG. 6, according to some embodiments herein.

Array 610 comprising the plurality of directional radiating elements may include patch antennas where the signals radiating by each patch antenna of the array cooperate or otherwise interact with each to produce a signal having a higher gain than the single patch antenna configuration. FIG. 7 is a depiction 700 of an antenna radiation pattern, in accordance with some embodiments herein. FIG. 7 shows a radiation distribution pattern 705 for a RF signal (RF frequency=2.45 GHz) shaped by an array 715 of antennas co-located with lighting fixture 710. The gain of the patch antennas across the distribution is conveyed by the variations in the shading of radiation pattern 705.

Figure 8:
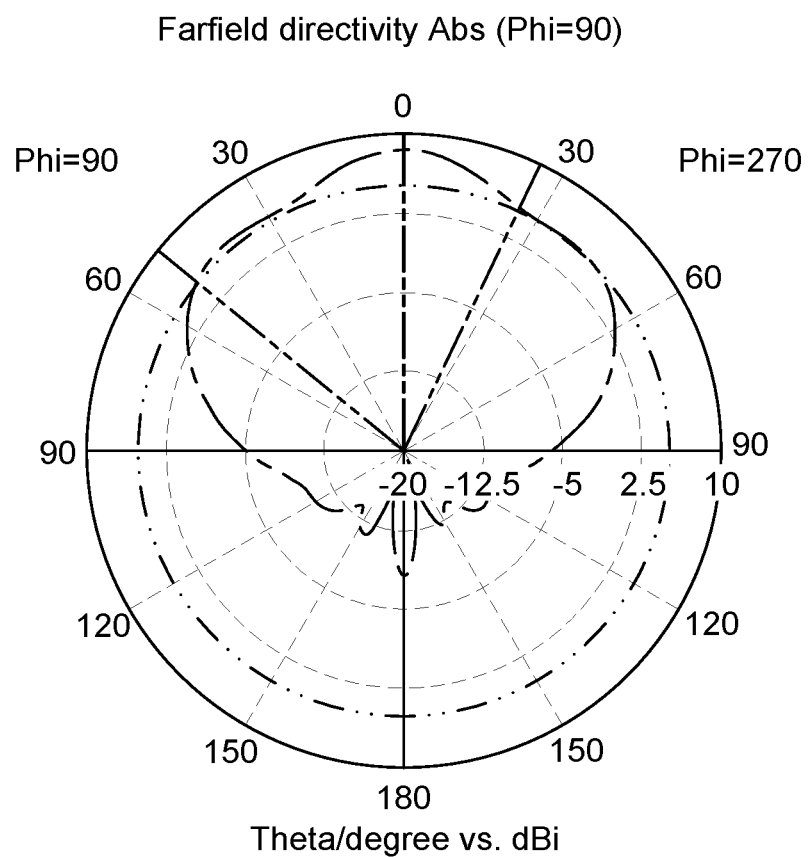
FIG. 8 is a radiation distribution plot corresponding to a lighting fixture having a single directional radiating element, according to some embodiments herein.
Figure 9:
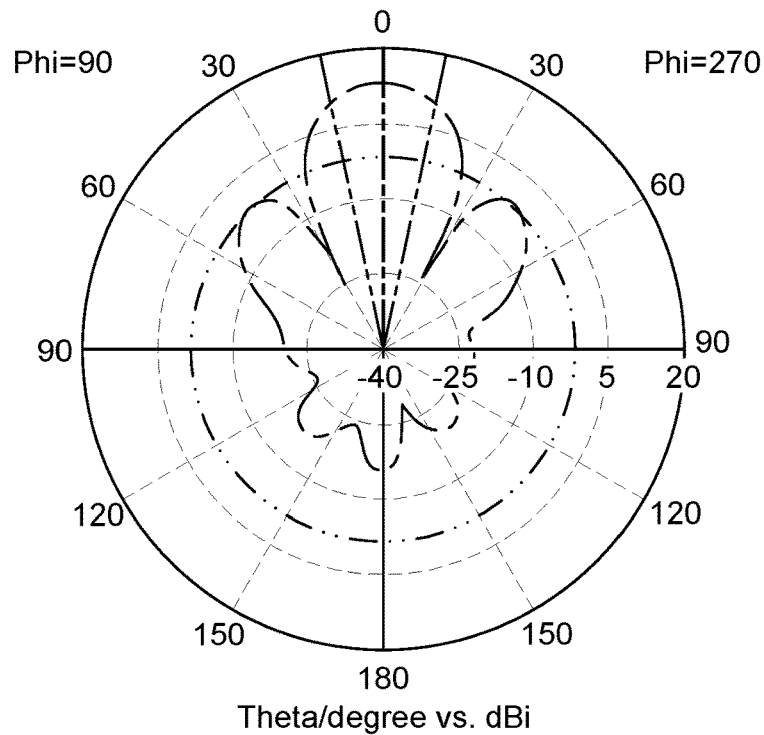
FIG. 9 is a radiation distribution plot corresponding to a lighting fixture having an array of a plurality of directional radiating elements, according to some embodiments herein.

FIGS. 8 and 9 are illustrative representations of the radiation distribution for a lighting fixture herein having a single patch antenna and an array of patch antennas, respectively, in accordance with some aspects herein. As shown, the radiation pattern on FIG. 9 is more focused than the radiation pattern of FIG. 8. As will be discussed in greater below, a more focused radiation pattern by a lighting fixture herein may facilitate a greater location determining functionality.

In some embodiments, the RF transmitter and antennas comprising a lighting fixture herein may be integrated into a common component or module or packaged as separate modules.

Figure 10:
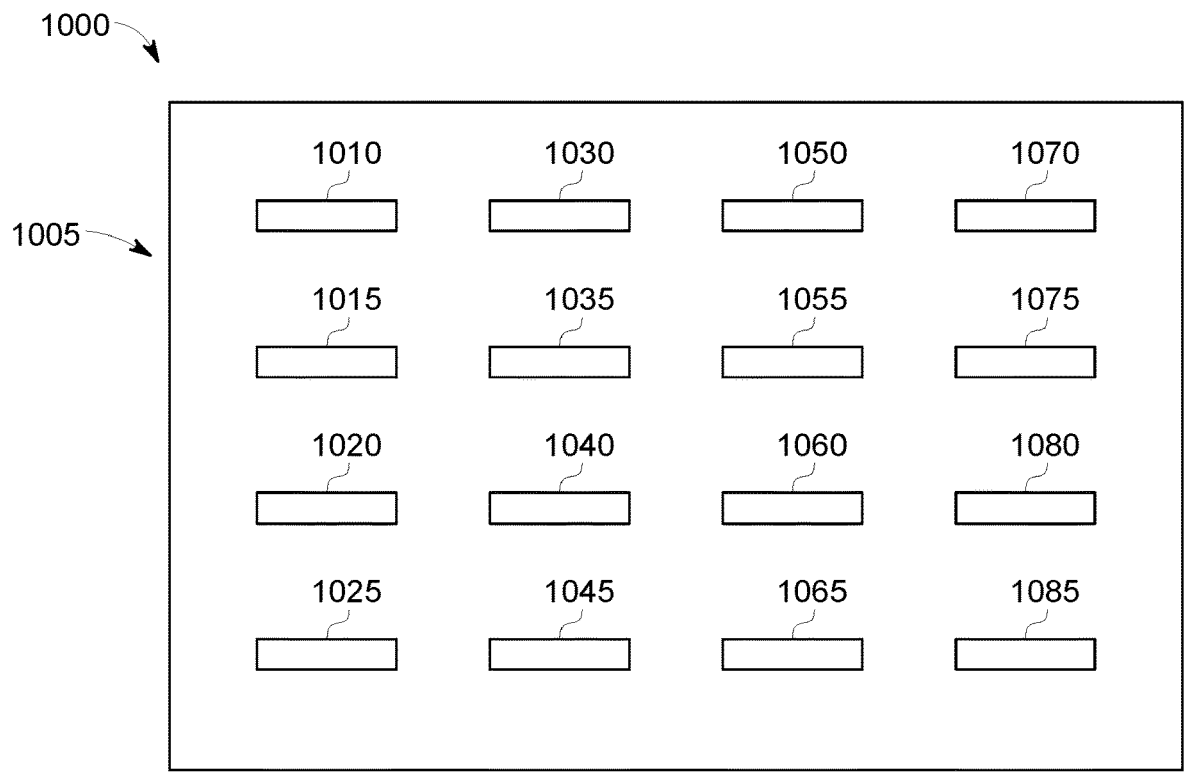
FIG. 10 is an illustrative depiction of a system including a plurality of lighting fixtures, in accordance with some embodiments herein.

FIG. 10 is an illustrative block diagram depiction of a system 1000, in accord with some aspects and embodiments herein. System 1000 includes a plurality of lighting fixtures 1010-1085 located within a facility 1005. Each of the lighting fixtures shown in FIG. 10 may include a housing and a light source, a RF transmitter, and a directional radiating element within the housing as discussed hereinabove. In an effort to maintain clarity, the various components comprising each of the lighting fixtures 1010-1085 are not shown in FIG. 10 since a full disclosure of such is presented above. In some embodiments, the arrangement, configuration or location of lighting fixtures 1010-1085 is known by an entity such as a service provider, a system administration, or other entity. In some embodiments, the location of the individual lighting fixtures 1010-1085 may be known relative to a universal coordinate or position system (e.g., latitude and longitude coordinates), relative to one or more other objects having a known location or relative to each other.

In accordance with other aspects herein, each of the lighting fixtures 1010-1085 includes a directional radiating element or antenna (not shown in FIG. 10) that directs a signal transmitted by the included RF transmitter primarily and substantially downward and away from the lighting fixture when the lighting fixture is disposed in, on, or supported by a ceiling of facility 1005. In accordance with some methods and process herein, lighting fixtures 1010-1085 are each operative to transmit a signal including an indication of the identifier associated with its RF transmitter (and by extension the light fixture) in a predefined direction away from the light fixture. In some embodiments, the directional radiating element or antenna of each lighting fixture directs its RF signal substantially downward, away from, and primarily directly below the lighting fixture when the lighting fixture is disposed in, on, or supported by the ceiling(s) of facility 1005. Furthermore, a mobile receiver configured to detect, receive, and process the signals transmitted by lighting fixtures 1010-1085 may receive the signals when the receiver is operational and in the vicinity of the lighting fixtures.

As used herein, the term "vicinity" refers to an area within the range of the signal(s) transmitted by the lighting fixtures herein. Accordingly, the actual "vicinity" for a particular embodiment may be dependent on the range of the RF transmitter of the lighting fixtures. Other factors may, in some contexts and configurations, also impact the effective definition of the "vicinity" of the lighting fixtures since other factors such as signal reflections and interference can impact the effective range of transmitted signals and/or their reception by a receiver.

Figure 11:
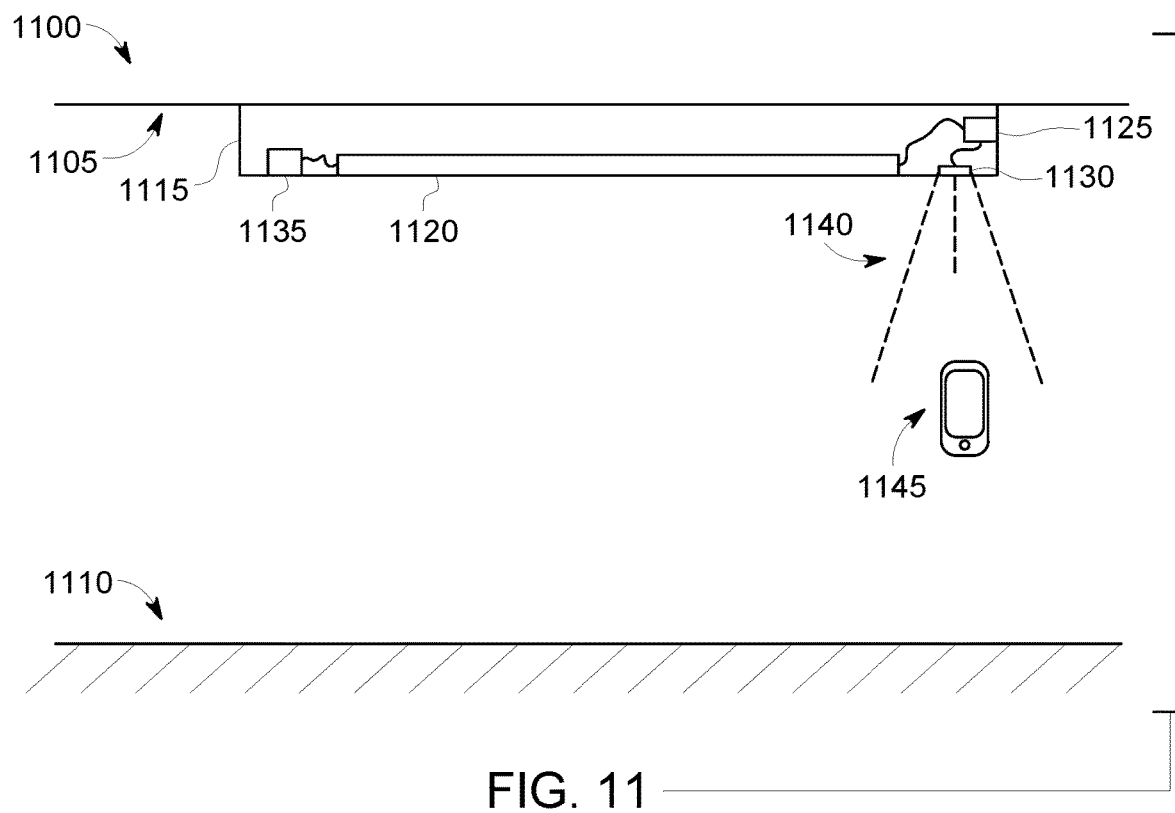
FIG. 11 is an illustrative depiction of a portion of a system, in accordance with some embodiments herein.

FIG. 11 is an illustration of an indoor environment or facility 1100 that may include one or more lighting fixtures, in accordance with some embodiments herein. Facility 1100 may be any indoor space in some regards. Facility 1100 includes a ceiling 1105 and a floor 1110 with a lighting fixture 1102 disposed on, in, or supported by the ceiling. Lighting fixture 1102 includes a housing 1115 that houses a light source 1120, a RF transmitter 1125, and a directional radiating element 1130 that are operationally functional as described above. Lighting fixture 1102 further includes a power source 1135 that is configured to operatively provide sufficient power to energize and power the components of the lighting fixture as appropriate. For example, power source 1135 may provide power to energize light source 1120 and RF transmitter 1125, either directly or indirectly and with the appropriate currents and/or voltages. Accordingly, a need to provide a separate power supply for the RF transmitter herein may be avoided. Lighting fixture 1102 is further configured to include the requisite wiring and interconnects between the components thereof, including electrical wiring, interconnects, and RF line feeds (not individually labeled in FIG. 11).

As illustrated by the dashed lines in FIG. 11, the RF signal transmitted by RF transmitter 1125 is directed primarily downward and away from the lighting fixture 1102 to a location substantially underneath the lighting fixture. As such, signal 1140 may be received by a mobile device 1145 that is configured to detect, receive, and process the signal. In some aspect, mobile device 1145 may comprise a mobile phone (e.g., a smartphone) or other device having functionality to detect, receive, and process signal 1140. The functionality to detect, receive, and process signal 1140 by mobile device as it traverses facility 1100 (and 1200) may be implemented by hardware (e.g., an antenna, a transceiver, etc.), software (e.g., firmware, an application or "app", etc.) and a combination thereof.

Figure 12:
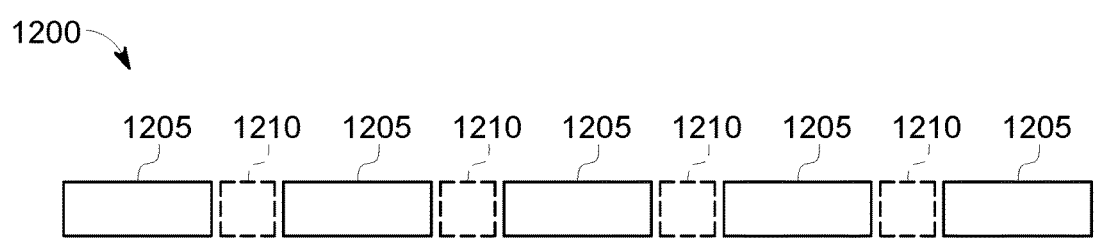
FIG. 12 is a schematic block diagram of a system, in accordance with some embodiments herein.

In another embodiment herein, the antenna may be integrated with an extension module. As referred to herein, an extension module can be an electrical, mechanical, or electro-mechanical device that may be connected to one or more individual fixtures through, generally, mechanical and electrical connection(s) located on the lighting fixture(s). In some embodiments, an extension module may be connected to one individual lighting fixture. In some embodiments, one or more devices, systems, and sensors may be attached to or housed in or on an extension module. In some embodiments, an extension module can connect two light fixtures such as, for example, two light fixtures in a row of light fixtures assembled on a ceiling. The antenna integrated in an extension module may be in the shape of a helix (i.e., a helical antenna) or a yagi antenna that fits within the inner confines of the extension module. In some embodiments, the helical antenna may have a higher gain than a single planar antenna. In the instance the antenna is integrated with an extension module, the RF transmitter may also be integrated to the extension module. FIG. 12 is an illustrative depiction of a row of lighting fixtures where a plurality of lighting fixtures 1205 have an extension module 1210 joining pairs of the lighting fixtures to each other. In accordance with some aspects herein, a directional radiating element (i.e., antenna) may be integrated into the extension module.

Figure 13:
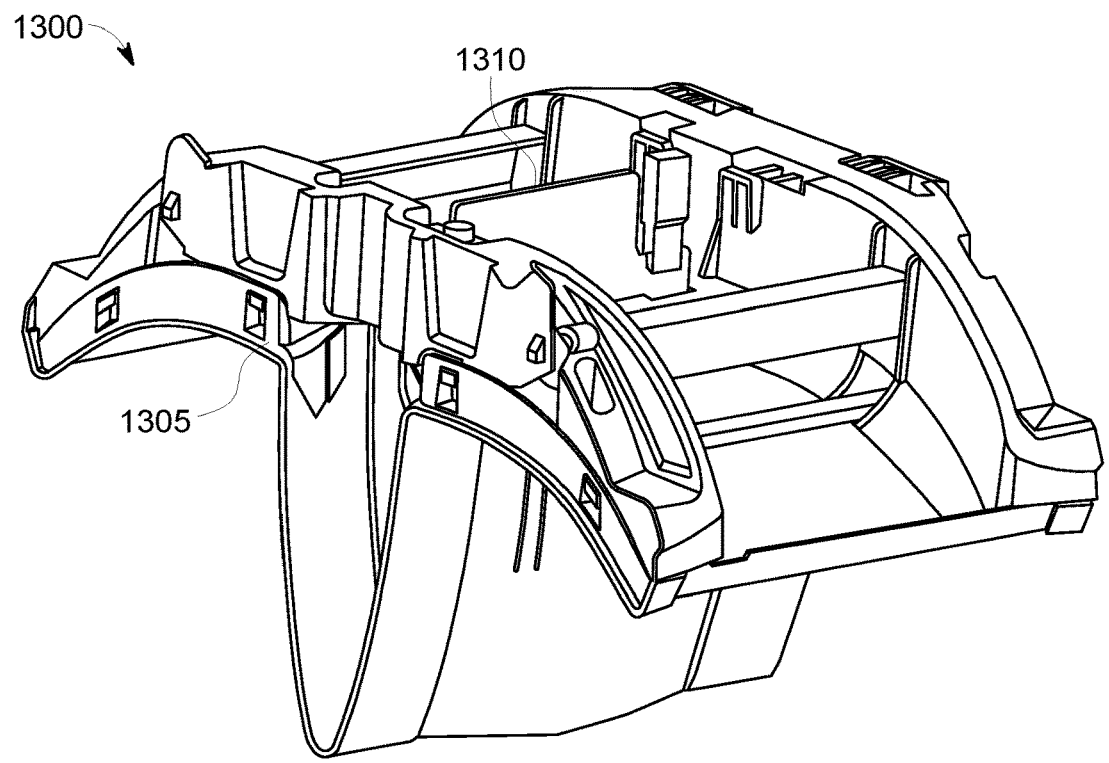
FIG. 13 is an illustrative depiction of an extension module, in accordance with some embodiments herein.

FIG. 13 is an illustrative rendering of an extension module 1300 for a lighting fixture including some embodiments herein. As shown extension module has a housing 1305 sized and configured to matingly attach to a lighting fixture at the distal ends thereof. Moreover, extension 1300 includes a PCB 1310 including an antenna (e.g., antenna, yagi antenna, and other types and configurations of antennas) and a RF transmitter.

Figure 14:
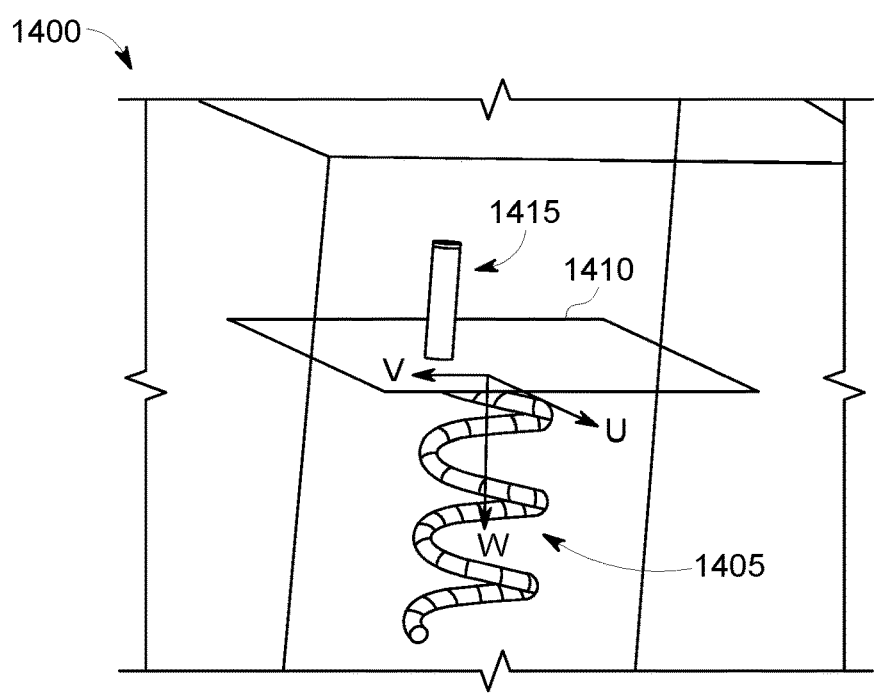
FIG. 14 is an illustrative depiction of a helical antenna, in accordance with some embodiments herein.

FIG. 14 is an illustrative depiction of a helical antenna 1400. In particular, helical antenna 1400 includes a helix 1405, a ground plane 1410, and a feed line 1415.

Figure 15:
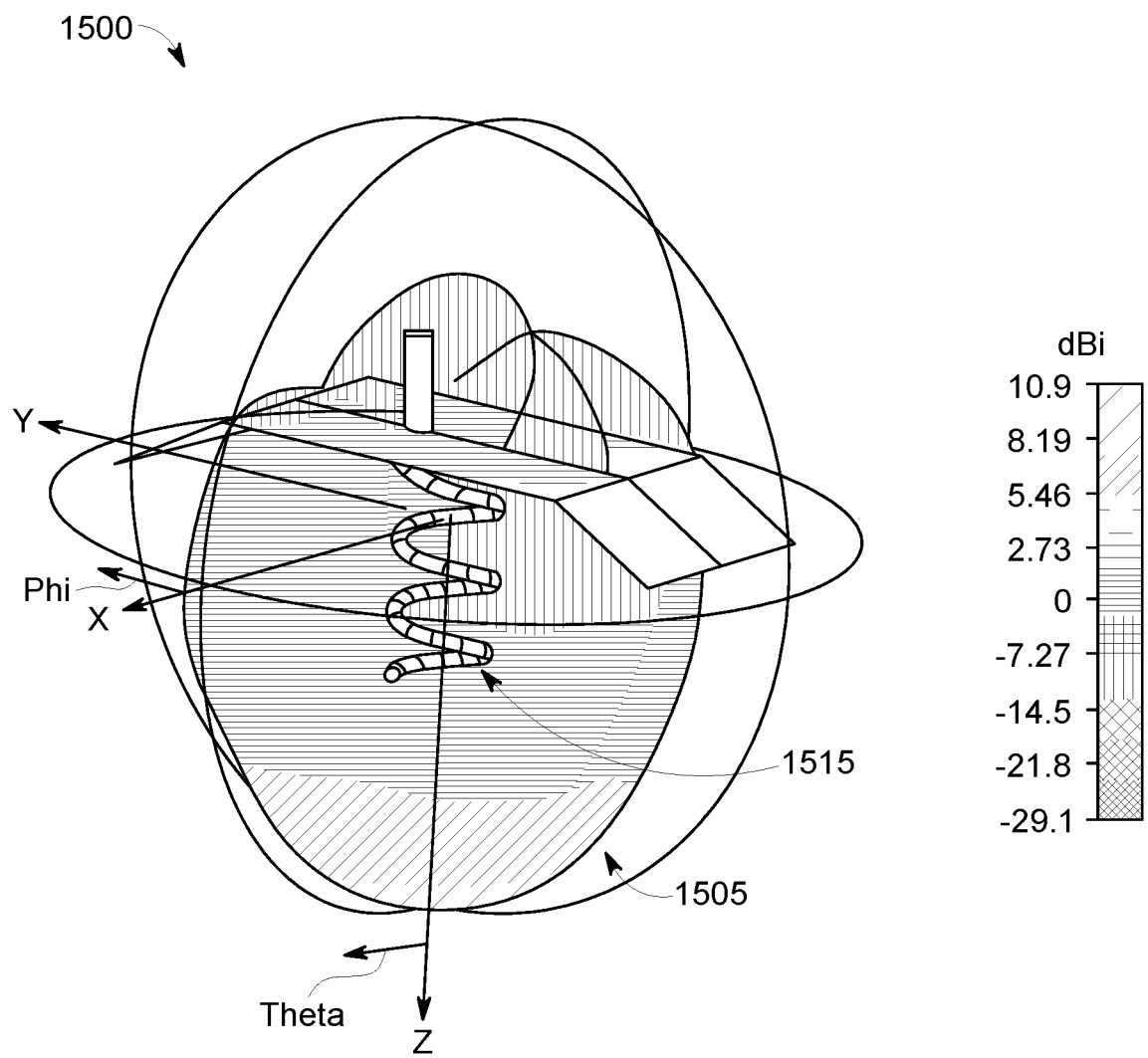
FIG. 15 is an illustrative depiction of a radiation pattern for a helical antenna, in accordance with some embodiments herein.

FIG. 15 is a depiction 1500 of an antenna radiation pattern, in accordance with some embodiments herein. FIG. 15 shows a radiation distribution pattern 1505 for a RF signal shaped by a helical antenna 1515 that can be co-located with a lighting fixture herein. The gain of the helical antenna across the distribution is conveyed by the variations in the shading of radiation pattern 1505.

Figure 16:
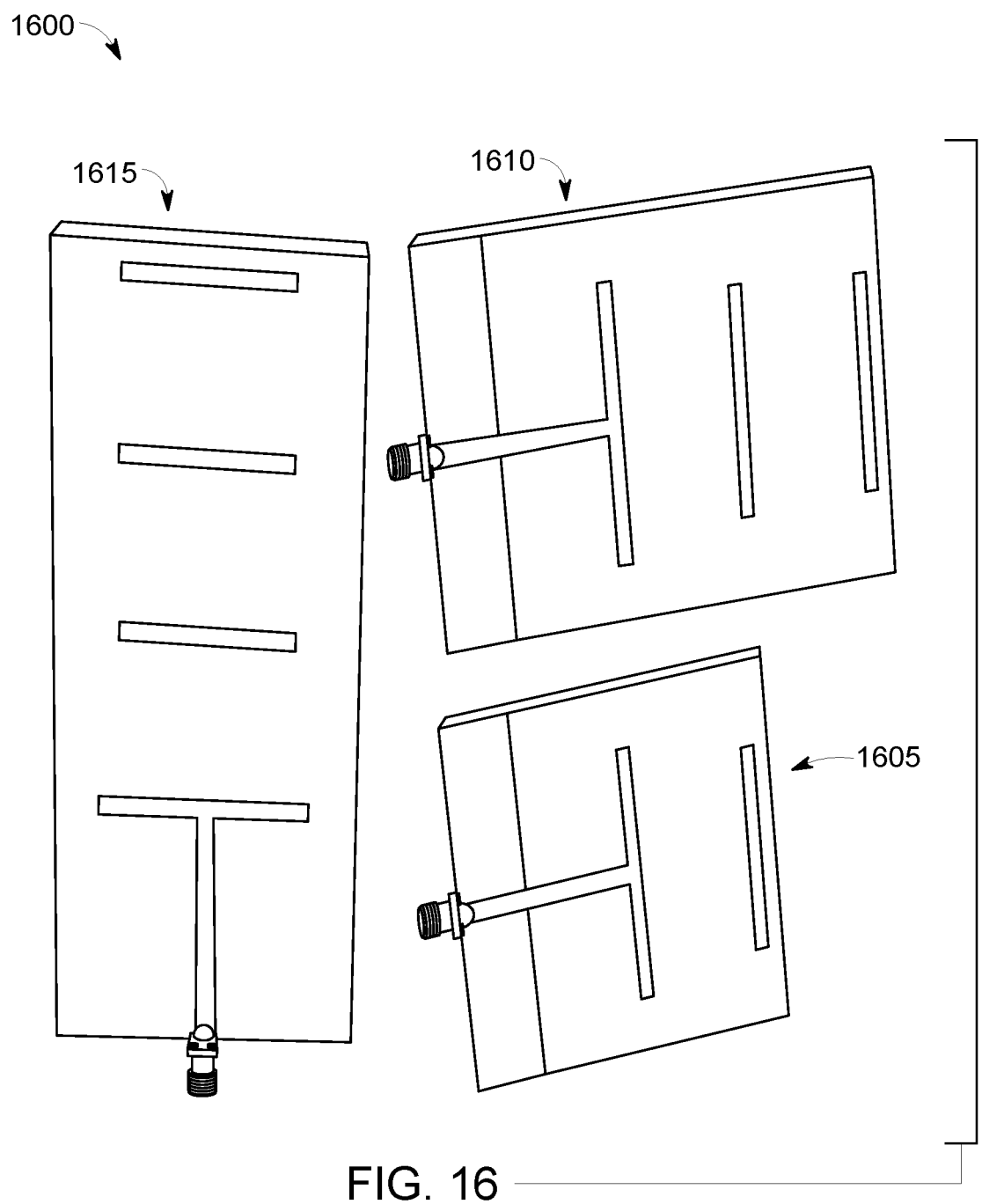
FIG. 16 is an illustrative depiction of a Yagi antenna, in accordance with some embodiments herein.

FIG. 16 is an illustrative depiction 1600 of a number of Yagi antennas that may be incorporated into the lighting fixtures disclosed herein. Yagi antenna 1605 includes a single dipole or director element, antenna 1610 has two dipoles, and antenna 1615 includes three dipoles or director elements. Regarding the radiation pattern and gain of the Yagi antennas, Applicant(s) realized adding 3 directors did not significantly improve the radiation parameter as much as the switch from the one director Yagi antenna to the two director Yagi antenna. Taking into account the smaller size, the Yagi antenna with two directors may be considered the relative best choice. In some aspects, it is noted that one benefit of the Yagi type antenna is that their parameters do not depend much on the substrate used.

Figure 17:
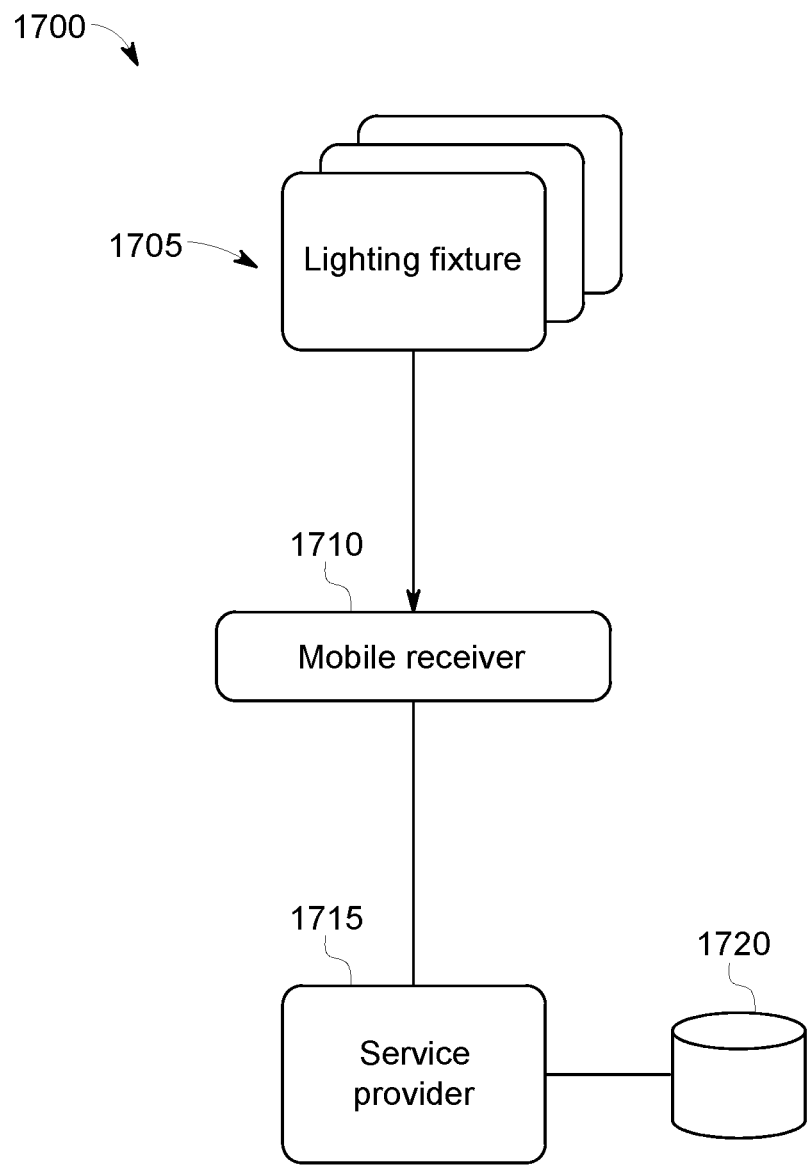
FIG. 17 is an illustrative block diagram of a system, in accordance with some embodiments herein.

FIG. 17 is an illustrative depiction of a system 1700, in accordance with some embodiments herein. System 1700 includes a plurality of lighting fixtures 1705 where each directionally transmits a signal including an identifier for the lighting fixture. System 1700 further includes a receiver 1710 for functionality detecting, receiving, and processing the transmitted signal from the lighting fixture. An entity such as a service provider 1715 can communicate with receiver 1710 to provide or support processing of the signal or representations thereof by the receiver. In some aspects, receiver 1710 may provide an identifier included in the signal(s) it receives and service provider can determine the location of the lighting fixture based, at least in part, on the identifier it received in a transmission from the receiver. The receiver and servicer provider may communicate in real-time as receiver 1710 moves about a facility (e.g., 1000 and 1100) and receives signals from light fixtures. Receiver 1710 may operate to detect and receive a signal and determine its signal strength. Based on the signal strength of the signal(s) received at receiver 1710, either as an absolute strength or as a relative strength compared to other relevant signals it may also be receiving, receiver 1710 may determine it is most closely located in the vicinity of a particular lighting fixture. The unique identifier included in the signal determined to be indicative of the lighting fixture most closely located to the receiver can be noted and retained in a record or other signal. The receiver and/or the service provider 1715 can use the identifier associated with the lighting fixture determined to be closest to the receiver to determine a location of the receiver (and by extension its user) within a facility (e.g., 1000 or 1100). Service provider 1715 may include a processor for processing information and executing instructions to provide its functionality and a storage facility 1720. Storage facility 1720 may comprise a database including one or more nodes and organizing data using a variety of data structures and schemas, without limits herein. In some embodiments, a mapping of the receiver within the facility can be provided by the receiver and/or service provider 1715. The mapping functionality may be facilitated by data stored on receiver 1710, storage facility 1720, and third-party service providers (not shown in FIG. 17) that receiver 1710 and/or service provider 1715 may communicate with.

In some embodiments, maps may be downloaded to the mobile device or receiver 1710 for location determinations and/or mappings performed by the mobile receiver. In some embodiments, the mobile receiver detects the signals transmitted by the lighting fixtures and sends the unique identifier of the strongest signal (i.e., the closest lighting fixture due to the focused directional characteristic radiation of the lighting fixtures herein) to the service provider 1715. The service provider 1715 may then determine the location of the mobile receiver and send a representation of a map showing the mobile receiver's location to the mobile receiver 1710.

Figure 18:
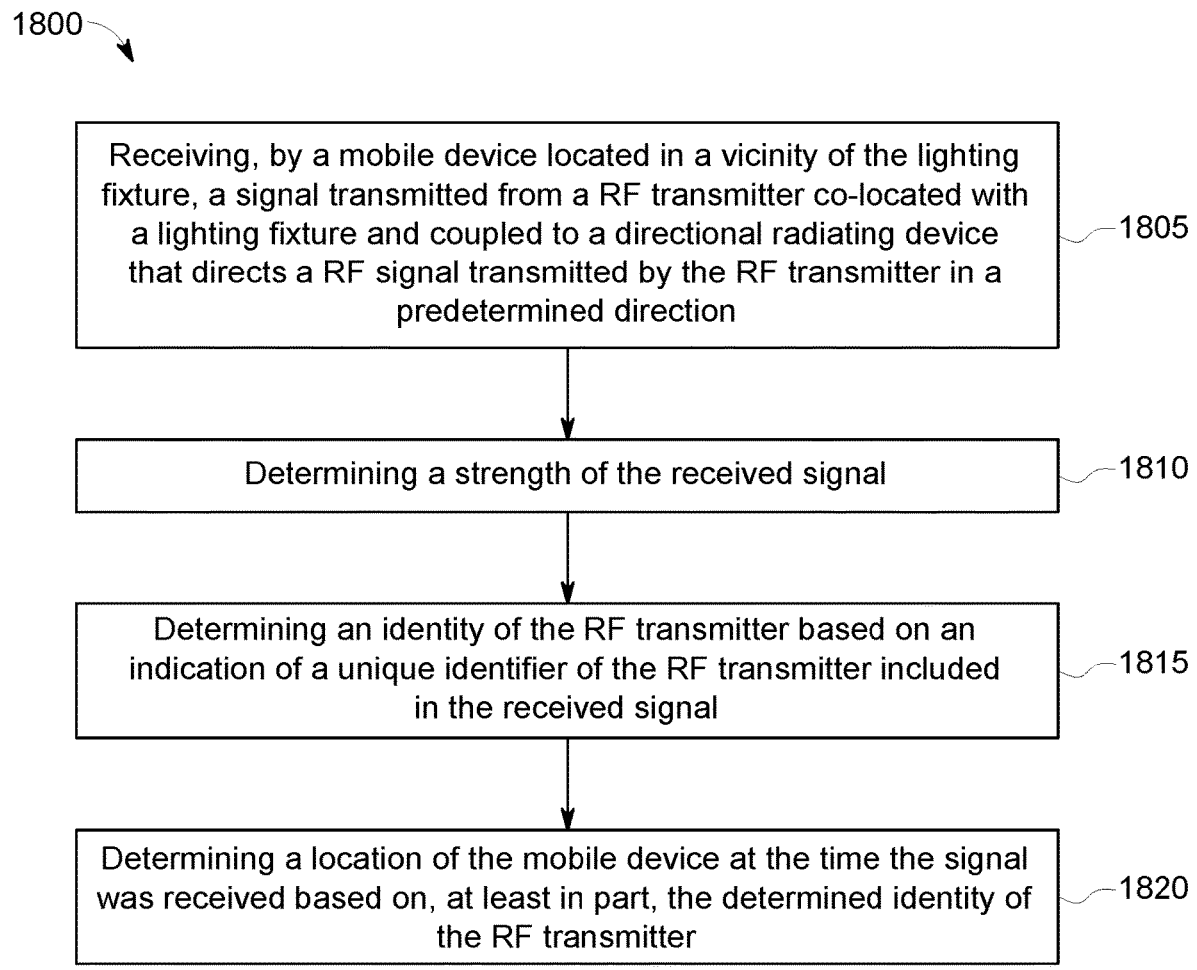
FIG. 18 is a flow diagram of a process, in accordance with some embodiments herein.

FIG. 18 is an illustrative depiction of a flow diagram for a process 1800. Process 1800 may be implemented by software components, hardware components, and a combination thereof, including systems such as those shown in FIGS. 11, 12, and 17.

In some embodiments and prior to operation 1805, a facility may be outfitted with one or more lighting fixtures configured as disclosed herein. Part of the outfitting may include obtaining and recording the specific installation location of each of the plurality of lighting fixtures. Additionally, the radiating pattern of the RF transmitter and directional radiating element combination for each lighting fixture will also be determined, obtained, or otherwise known. In some embodiments, a mapping (ie., coordinates) of the lighting fixtures may be determined. The mapping of the lighting fixtures may be established in a record. The mapping of the lighting fixtures may be represented in a tabular or graphical representation of the facility. One or more of the information concerning the location of the lighting fixtures, the radiation pattern(s) of the lighting fixtures, the identifiers of the plurality of lighting fixtures, the mapping of the location of the plurality of lighting fixtures, and other information may be maintained in a one or more records or other data structures and stored by a mobile receiver (e.g., 1710), a service provider (e.g., 1715), and combinations thereof.

Process 1800 includes an initial operation of receiving a signal transmitted from a RF transmitter that is co-located with a lighting fixture by a mobile receiver in the vicinity of the lighting fixture. The lighting fixture itself includes a directional radiating element such as a patch antenna to shape and direct the RF signal in a predetermined direction.

Process 1800 continues at operation 1810 where a determination of the signal received by the mobile receiver is executed. The strength of the received signal is determined in an effort for the receiver to determine the lighting fixture to which it is closest located. In some embodiments, a signal below a predetermined threshold may be disregarded. That is, the received signal must have a minimum strength at the receiver. In some embodiments, this minimum threshold may be determined and based on a number of factors, including but not limited to the configuration of a plurality of lighting fixtures within a facility, a strength of the signals transmitted by the disposed lighting fixtures, a sensitivity of the mobile receiver or an expected (average) sensitivity thereof, the physical configuration of the deployed system (e.g., ceiling height, height of directional radiating element of the installed lighting fixtures, expected (average) height of a mobile receiver in the facility, other considerations, and combinations thereof. For example, a received signal greater than −50 dBm may indicate the mobile receiver is directly below a lighting fixture and a signal less than about −60 dBm may indicate that the mobile receiver is about 2 meters away from the lighting fixture.

At operation 1815, an identity of the RF transmitter associated with the signal determined at operation 1810 to be closest to the receiver is determined. The identity of the RF transmitter is based on an indication of the RF transmitter's unique identity that is included in the received signal. The unique identifier may be included in a data packet transmitted with the RF signal.

Process 1800 continues to operation 1820 where a location of the mobile device receiver at the time the signal was received is determined. The location determination of operation 1820 may be based, at least in part, on the identity of the RF transmitter (and by extension the lighting fixture) determined at operation 1815. The location thus determined may be communicated to a user of the mobile device receiver in a textual or graphical representation. In a graphical representation, the location of the mobile device may be shown as an icon or other marker overlaid on a graphical representation of the facility housing the lighting fixture.

In some aspects, including a context including a smaller building/facility and other scenarios, an operation of a process for determining a location of a receiver in the a facility including one or more lighting fixtures may include downloading a map with locations of the lighting fixtures to the mobile receiver device so that the location of the mobile device may be determined by the mobile device.

In some embodiments, RF signals transmitted from multiple devices may be used to accurately determine a position of a mobile device receiving the RF signals. For example, the mobile receiver device may use a form of triangulation to process the multiple RF signals to determined its position.

In some embodiments, a location determined for a mobile receiver device herein may be used in conjunction with a service, application, or process to provide an additional service or other functionality. For example, the determined location may be used by a location-based service to provide coupons and/or advertisements in real-time to a user via their mobile device as they traverse a retail location outfitted with lighting fixtures having RF transmitters as disclosed herein.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Figure 19:
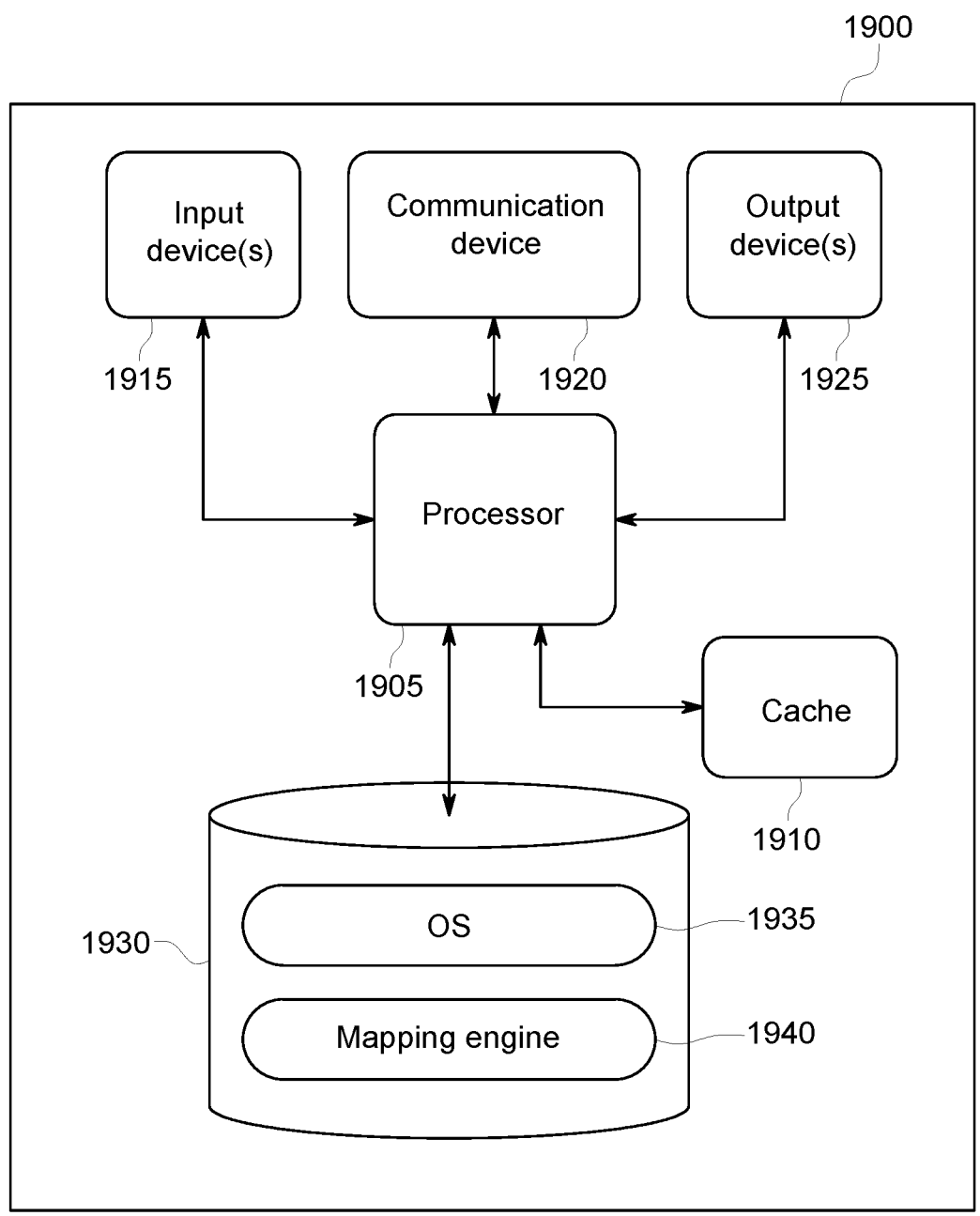
FIG. 19 is an illustrative depiction of an apparatus, in accordance with some aspects and embodiments herein.

FIG. 19 is an illustrative depiction of a system, apparatus, or device that may be used to, for example, implement one or more of the logical descriptions of abstractions of FIG. 13. FIG. 19 is a block diagram of a computing device or machine, in accordance with some embodiments. System 1900 may be, for example, associated with devices for implementing the processes disclosed herein, including the disclosed indoor positioning system process(es). System 1900 comprises a processor 1905, such as one or more commercially available Central Processing Units (CPUs) in the form of one-chip microprocessors or a multi-core processor, coupled to a communication device 1920 configured to communicate via a communication network (not shown in FIG. 19) to another device or system (e.g., a mobile device receiver). System 1900 may also include a cache 1910, such as RAM memory modules. The system may further include an input device 1915 (e.g., a touchscreen, mouse and/or keyboard to enter content) and an output device 1925 (e.g., a touchscreen, a computer monitor to display, a LCD display). In some embodiments, system 1900 may perform at least some of the functions associated with one or more of the logical descriptions and abstractions of FIG. 13.

Processor 1905 communicates with a storage device 1930. Storage device 1930 may comprise any appropriate information storage device, including combinations of magnetic storage devices (e.g., a hard disk drive), optical storage devices, solid state drives, and/or semiconductor memory devices. In some embodiments, storage device 1930 may comprise a database system, including in some configurations an in-memory database.

Storage device 1930 may store program code or instructions to control an operation of a computing device (e.g., system 1900) to perform mobile device location determination and mapping functions, in accordance with processes herein. Processor 1905 may perform the instructions for implementing, for example, process 11900 in accordance with any of the embodiments described herein. Program instructions for determining a location for a mobile device in a indoor facility executed by a mapping engine 1940 may be provided, as well as other program elements, such as an operating system 1935. Storage device 1930 may also include data used by system 1900, in some aspects, in performing one or more of the processes herein, including individual processes, individual operations of those processes, and combinations of the individual processes and the individual process operations.

Although embodiments have been described with respect to certain contexts, some embodiments may be associated with other types of devices, systems, and configurations, either in part or whole, without any loss of generality. For example, in some embodiments, a yagi antenna may be used to radiate signals parallel to the antenna. In some such embodiments, the antenna may be housed in separate module where the module is positioned to take advantage of the radiation pattern of the yagi antenna.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
receiving, by a processor of a mobile device located in a vicinity of a lighting fixture, a signal transmitted from a radio frequency (RF) transmitter co-located with the lighting fixture and coupled to a directional radiating antenna that radiates a RF signal transmitted by the RF transmitter into a predetermined shape that is not omni-directional;
determining, by the processor of the mobile device, a strength of the received signal;
determining an identity of the RF transmitter based on an indication of a unique identifier of the RF transmitter included in the received signal; and
determining a location of the mobile device at the time the signal was received based, at least in part, on the determined identity of the RF transmitter.

2. The method of claim 1, further comprising displaying the indication of the determined location of the mobile device relative to the lighting fixture within an enclosed structure.

3. The method of claim 1, wherein the mobile device comprises a display for displaying the indication of the determined location of the mobile device.

4. The method of claim 1, further comprising providing a service based on the determined location of the mobile device at the time the signal was received by the mobile device.

* * * * *